US010825216B2

(12) United States Patent
Abe

(10) Patent No.: US 10,825,216 B2
(45) Date of Patent: Nov. 3, 2020

(54) APPARATUS FOR READING VALUE MEASURED WITH ANALOG MEASURING TOOL

(71) Applicant: MITUTOYO CORPORATION, Kawasaki (JP)

(72) Inventor: Shinsaku Abe, Sapporo (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/210,477

(22) Filed: Dec. 5, 2018

(65) Prior Publication Data

US 2019/0180487 A1   Jun. 13, 2019

(30) Foreign Application Priority Data

Dec. 7, 2017 (JP) .................................. 2017-235603
May 9, 2018 (JP) .................................. 2018-090873

(51) Int. Cl.

| G06T 11/60 | (2006.01) |
|---|---|
| G06T 7/50 | (2017.01) |
| G06T 7/70 | (2017.01) |
| G06K 9/62 | (2006.01) |
| G01B 3/22 | (2006.01) |
| G06T 17/00 | (2006.01) |
| G01B 3/18 | (2006.01) |
| G01B 3/38 | (2006.01) |
| G01B 5/02 | (2006.01) |
| G06T 11/20 | (2006.01) |
| G01B 3/20 | (2006.01) |

(52) U.S. Cl.

CPC ............... *G06T 11/60* (2013.01); *G01B 3/18* (2013.01); *G01B 3/20* (2013.01); *G01B 3/22* (2013.01); *G01B 3/38* (2013.01); *G01B 5/02* (2013.01); *G06K 9/6202* (2013.01); *G06T 7/50* (2017.01); *G06T 7/70* (2017.01); *G06T 11/206* (2013.01); *G06T 17/00* (2013.01); *G01B 2210/60* (2013.01)

(58) Field of Classification Search
CPC ....... G06T 19/006; G06T 11/60; G06T 13/00; G06T 15/20; G06T 17/00; G06F 3/0482; G06F 9/4446; G06F 17/241
See application file for complete search history.

(56) References Cited

U.S. PATENT DOCUMENTS

2012/0303336 A1* 11/2012 Becker .................. G01B 11/03
                                                                   703/1
2019/0096274 A1*  3/2019 Solomon ................. G09B 7/08

FOREIGN PATENT DOCUMENTS

JP         2016-186439 A     10/2016

* cited by examiner

*Primary Examiner* — Chong Wu
(74) *Attorney, Agent, or Firm* — Oliff PLC

(57) ABSTRACT

An apparatus reads a value measured with an analog measuring tool. The apparatus includes an imaging unit for obtaining a captured image of the analog measuring tool that is indicating a measured value, a retaining unit for retaining a 3D model of the analog measuring tool, a matching unit for specifying a 3D model matching the captured image, a guidance unit for outputting guidance information for correcting orientation of the analog measuring tool based on the matched 3D model, a reading unit for reading the measured value from the captured image to generate a measurement result, and an output unit for outputting the measurement result.

7 Claims, 17 Drawing Sheets

APPARATUS FOR READING VALUE MEASURED WITH ANALOG MEASURING TOOL

CROSS-REFERENCE TO RELATED APPLICATION

This application claims priority from Japanese Patent Applications No. 2017-235603 filed on Dec. 7, 2017 and No. 2018-090873 filed on May 9, 2018, the entire subject-matter of which is incorporated herein by reference.

TECHNICAL FIELD

The present disclosure relates to an apparatus for reading a value measured with an analog measuring tool, and more particularly, to an apparatus for reading the measured value of the analog measuring tool, which is capable of automatically recognizing a measured value indicated by various analog measuring tools, is robust against disorder of a tool posture or dirt, and is capable of automatically recording the measured value.

BACKGROUND

Digitalized measuring tools (hereinafter, digital measuring tools) have been actively developed. A measured value of a digital measuring tool is displayed on a liquid crystal display device of the measuring tool or directly output to a computer, and thus, the measured value can be easily read and used, and a time taken to perform measurement can be reduced.

On the other hand, since a digital measuring tool is more expensive than an analog measuring tool and there are many types of measuring tools only provided in an analog type, analog measuring tools are still often used. However, an analog measuring tool has a problem that a measured value of the analog measuring tool has to be read from a scale line, a dial and the like carved on the measuring tool.

For example, FIGS. 3 and 5 illustrate a method of reading a scale of an analog micro-meter. In a case of a standard scale shown in FIG. 3, it is possible to read up to 0.01 mm unit from a sleeve reading (1 mm unit)+a thimble reading (0.01 mm unit). In this example, 7 mm of the sleeve reading+0.37 mm of the thimble reading=7.37 mm of the micro meter reading. By reading mismatch amount between a base line of the sleeve and a memory of the thimble, it is possible to read up to 0.001 mm unit. In a case of a vernier as shown in FIG. 5, it is possible to read up to 0.001 mm unit from the sleeve reading (1 mm unit)+thimble reading (where a base line of the sleeve and a scale of the thimble are aligned) (0.01 mm unit)+vernier and thimble scale reading (where a vernier scale and the thimble scale are aligned) (0.001 mm unit). In this example, the micro-meter reading is 6.213 mm from the sleeve reading 6 mm+thimble reading 0.21 mm+vernier and thimble scale reading 0.003 mm.

Therefore, in an analog measuring tool, since a user needs to calculate scale lines and it takes a time for the user to read a measured value, a time taken to perform measurement is longer than that of a digital measuring tool. In particular, a beginner, etc. is likely to make a mistake in reading a measured value, and thus there is a possibility of ending up with a wrong value as a measurement result. It is possible to read the analog measuring tool with high accuracy by measuring with the eye, but a variation in measurement results according to measuring persons occurs with easy. In addition, there may be many cases in which a measuring tool itself is contaminated in a measuring field and thus it is difficult to read the scale line, and then it is difficult to read a right value. In addition, since the reading method varies depending on models, it needs to be fully educated in order to rapidly and accurately read the measured value, and it may take a long period of time and expenses to learn how to measure.

Moreover, in order to manage measured values read from an analog measuring tool, there is a need to perform an input operation into an information processing device (e.g., PC (personal computer)) recently. Even in such an input operation, a measured part (which point of an object to be measured is to be measured) corresponding to an input part (where to input on a screen) has to be searched for, and on the contrary, an input part corresponding to a measured part has to be searched for, which results in a complicated input operation. Therefore, a total measurement time is increased.

In this aspect, JP-A-2016-186439 discloses a device including a unit for imaging a caliper, that is, an analog measuring tool, and reading a measured value from the image.

However, JP-A-2016-186439 does not disclose a method of reading a measured value of an analog measuring tool except a caliper, for example, an analog micro-meter, a dial caliper, an analog dial gauge, etc.

In addition, in the device disclosed in JP-A-2016-186439, an augmented reality (AR) technique is used only to provide a measured value. However, if the AR technique is applied to a case where a scale is not readable due to guidance during reading, dirt, etc., reading that is robust against disorder of a tool posture or dirt can be performed, and productivity can be further improved.

JP-A-2016-186439 does not disclose a method of recording a measured value read from an analog measuring tool in an information processing device in detail.

An object of the present disclosure is to provide an apparatus for reading a value measured with an analog measuring tool, the apparatus being capable of automatically recognizing a measured value indicated by various analog measuring tools, being robust against disorder of a tool posture or dirt, and being capable of automatically recording the measured value.

SUMMARY

An apparatus for reading a value measured with an analog measuring tool according to the present disclosure includes:

a sensor unit configured to obtain shape data representing an appearance configuration of the analog measuring tool;

a matching unit configured to specify a location or a region where a measured value of the analog measuring tool is indicated, based on the shape data;

an imaging unit configured to obtain a captured image of the analog measuring tool that is indicating a measured value;

a measured value reading unit configured to read the measured value indicated on the location or the region specified by the matching unit from the captured image to generate a measurement result; and a measured value output unit configured to output the measurement result.

According to the present disclosure, the imaging unit may be also used as the sensor unit, and the captured image obtained by the imaging unit may be used as the shape data.

The apparatus according to the present disclosure may further include:

a three-dimensional model retaining unit configure to retain a three-dimensional model of the analog measuring tool; and a three-dimension matching unit configured to specify the three-dimensional model that matches the shape data.

According to the present disclosure, the three-dimensional model of the analog measuring tool retained in the three-dimensional model retaining unit may include information about the location or the region where the measured value of the analog measuring tool is indicated, and the measured value reading unit may specify the location or the region where the measured value is indicated, with reference to the three-dimensional model specified by the three-dimension matching unit.

The apparatus according to the present disclosure may further include:

a guidance unit configured to output guidance information for correcting orientation of the analog measuring tool, based on the matched three-dimensional model.

According to the present disclosure, the measured value reading unit may correct the captured image based on the matched three-dimensional model.

The apparatus according to the present disclosure may further include:

a three-dimensional model registration unit configured to register the shape data of the analog measuring tool obtained by the sensor unit on the three-dimensional model retaining unit.

The apparatus according to the present disclosure may further include:

a display unit configured to display the captured image overlapping with the guidance information or the measurement result.

According to the present disclosure, the measured value output unit may output a graph generated by plotting the measurement result being in chronological order.

According to the present disclosure, the analog measuring tool may be an analog micro-meter, an analog micro-meter with a vernier, an analog caliper, an analog dial caliper, or an analog dial gauge. The measured value reading unit may generate an intermediate value of measured values of an analog dial gauge as the measurement result.

According to an apparatus for reading a value measured with the analog measuring tool of the present disclosure, it is automatically recognize a measured value indicated by various analog measuring tools, the apparatus is robust against disorder of a tool posture or dirt, and it is possible to automatically record the measured value.

DETAILED DESCRIPTION

Detailed embodiments of an apparatus for reading a value measured with an analog measuring tool will be described below with reference to accompanying drawings.

First Embodiment

Figure 1:
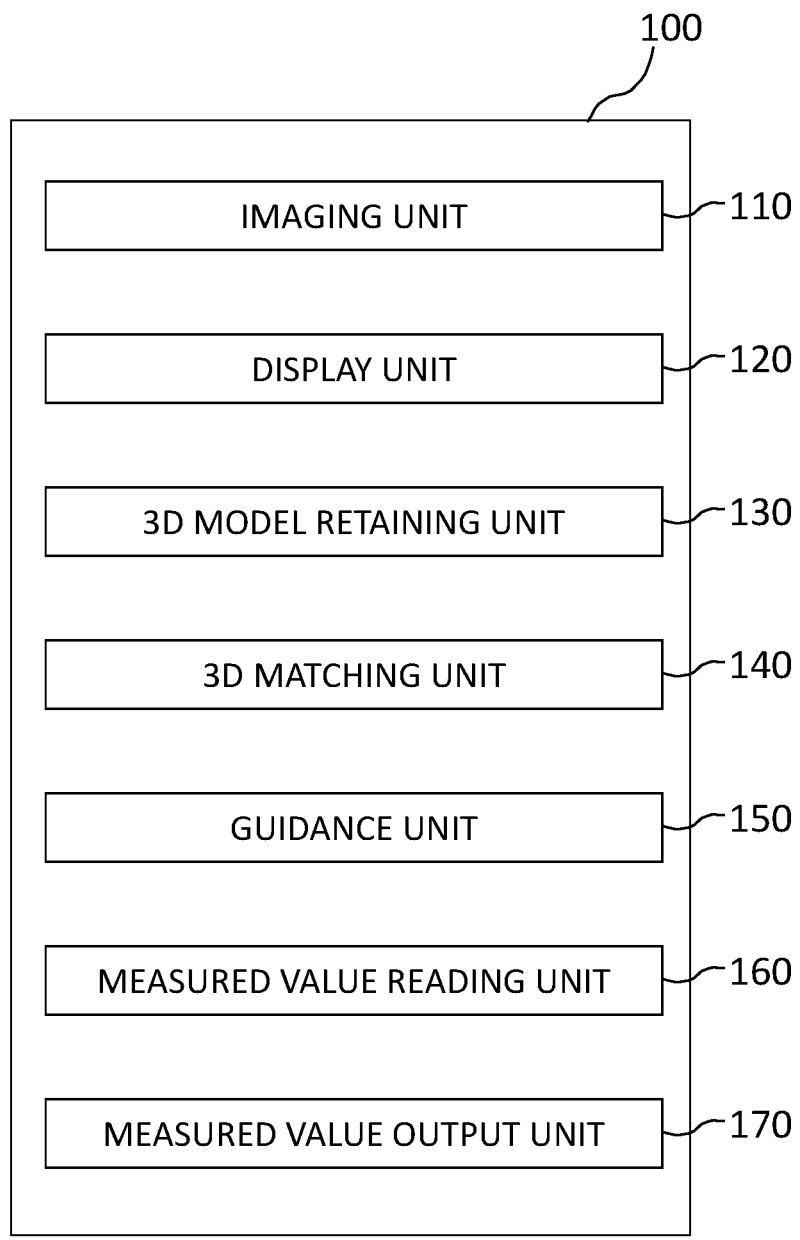
FIG. 1 is a block diagram illustrating a configuration of an apparatus for reading a value measured with an analog measuring tool, according to a first embodiment.

A configuration of an apparatus 100 for reading a value measured with an analog measuring tool according to the first embodiment of the present disclosure will be described with reference to a block diagram of FIG. 1. The apparatus 100 for reading a value measured with an analog measuring tool includes an imaging unit 110, a display unit 120, a three-dimensional model retaining unit (3D model retaining unit) 130, a three-dimension matching unit (3D matching unit) 140, a guidance unit 150, a measured value reading unit 160, and a measured value output unit 170. The apparatus 100 for reading a value measured with an analog measuring tool is generally an information processing apparatus including a central processing unit (CPU), a memory device, an input/output device (camera, display, etc.), a communication device, etc., and in the information processing apparatus, wherein the CPU reads and executes a program stored on the memory device to logically implement each of the above units. The apparatus 100 for reading the measured value of the analog measuring tool may be, for example, a smartphone, a smart glass, etc. including a camera. Alternatively, the apparatus 100 may be a PC to which a camera is connected.

The imaging unit 110 captures an image of an external appearance of an analog measuring tool, on which a measured value is indicated. The imaging unit 110 is generally a camera taking a still image or a video (hereinafter, captured image). Here, the analog measuring tool may be any kind of tool, provided that a measured value thereof can be observed from outside the analog measuring tool. The measured value is generally indicated on an outer appearance of the analog measuring tool by scales, a pointer, etc. so that a user may read the measured value with the eye. Since there is a need to read the measured value from an outer appearance image, it is preferable that the captured image of the imaging unit 110 is obtained at least with a posture, a range and a resolution that are necessary to identify a kind of the analog measuring tool and to read a measurement result.

The display unit 120 displays guidance information and the measurement result generated by the guidance unit 150 and the measured value reading unit 160 while overlapping them with the captured image of the imaging unit 110, that is, a real-time scene captured by the camera. As described above, the display unit 120 provides actual environment in which the measurement operation is performed according to the AR technique, after adding additional information such as the guidance information and the measurement result thereto. As such, a user can be guided to properly use the analog measuring tool, and at the same time, the measurement result can be promptly visible as a numerical value. As a result, an operation efficiency of the user who does not know how to read the measured value from the scale or may not read the measured value smoothly can be improved.

The 3D model retaining unit 130 previously retains three-dimensional model data (hereinafter, referred to as 3D model) of one or more analog measuring tools. The 3D model generally includes analog measuring tool CAD data, polygon data, etc. The 3D model further includes information such as scale lines, numbers allocated to the scale lines, etc., in addition to an outer appearance of the analog measuring tool. The 3D model includes information about a confronting direction of the analog measuring tool, that is, a direction of the analog measuring tool when the user properly holds the analog measuring tool. For example, the 3D model may be created so that three axes of a model coordinate system may respectively coincide with a vertical direction, a left-right direction, and a front-back direction of the analog measuring tool in a case where the analog measuring tool is properly held.

The 3D matching unit 140 compares the captured image of the imaging unit 110 with one or more 3D models of analog measuring tools retained by the 3D model retaining unit 130 to specify a kind of the analog measuring tool included in the captured image. The 3D matching unit 140 can determine, for example, when a plurality of characteristic points extracted from the captured image and a plurality of characteristic points included in the 3D model of an analog measuring tool X have a similarity of a predetermined level or greater, that the captured image and the analog measuring tool X match, that is, that the analog measuring tool included in the captured image is X. The 3D matching unit 140 can perform the above comparison using another arbitrary well-known technique.

The guidance unit 150 guides the user so that the analog measuring tool included in the captured image of the imaging unit 110 can be corrected in appropriate orientation, according to a matching result of the 3D matching unit 140. For example, the guidance unit 150 overlaps the 3D model with the analog measuring tool included in the captured image. Next, the guidance unit 150 determines whether there is a difference between the model coordinate system of the 3D model and a coordinate system defining the environment in which the 3D model is placed (hereinafter, referred to as a global coordinate system). When there is a difference, guidance information indicating a direction in which the 3D model (that is, the analog measuring tool overlapping with the 3D model) should be moved is displayed on the display unit 120 in order to eliminate the difference. As the guidance information, for example, a sign such as an arrow indicating the direction to which the analog measuring tool should be rotated or moved or a guidance indicated by letters such as "please reverse left and right" may be displayed. In addition, the guidance information displayed on the display unit 120 by the guidance unit 150 is not limited to the information indicating the direction to move the measuring tool, but may include information indicating, for example, how to move the imaging unit 110 included in the apparatus 100 for reading a value measured with an analog measuring tool. In other words, information indicating how a relative positional relationship between positions of the apparatus 100 for reading a value measured with an analog measuring tool and the measuring tool has to be changed may be used as the guidance information. The guidance unit 150 may preferably continue to generate and display the guidance information at a predetermined time interval, until the difference between the model coordinate system and the global coordinate system is equal to or less than a predetermined level.

The measured value reading unit 160 reads the measured value from the captured image of the imaging unit 110. The reading of the measured value can be generally performed by analyzing an image. For example, the measured value reading unit 160 specifies a location or a region where scales have to be represented on an outer surface of the analog measuring tool, with reference to the 3D model. Next, the measured value reading unit 160 recognizes scale lines and numbers on a corresponding region in the captured image. Here, when some of the scales and the numbers may not be recognized due to dirt or the like, the measured value reading unit 160 can complement scale lines and numbers which should have been represented originally with reference to the 3D model. Next, the measured value reading unit 160 reads and outputs the measured value from the scale lines according to a reading rule designated in advance according to a kind of the analog measuring tool.

The measured value output unit 170 outputs the measurement result generated by the measured value reading unit 160 to outside. For example, the measurement result may be output to the display unit 120. Alternatively, the measurement result may be output to a predetermined application program or an external information processing device. For example, the measurement result may be output to an application program having a function of generating and displaying a graph in real-time, and then a graph generated by plotting the measurement result in real-time may be provided to the user.

Example 1

Figure 2:
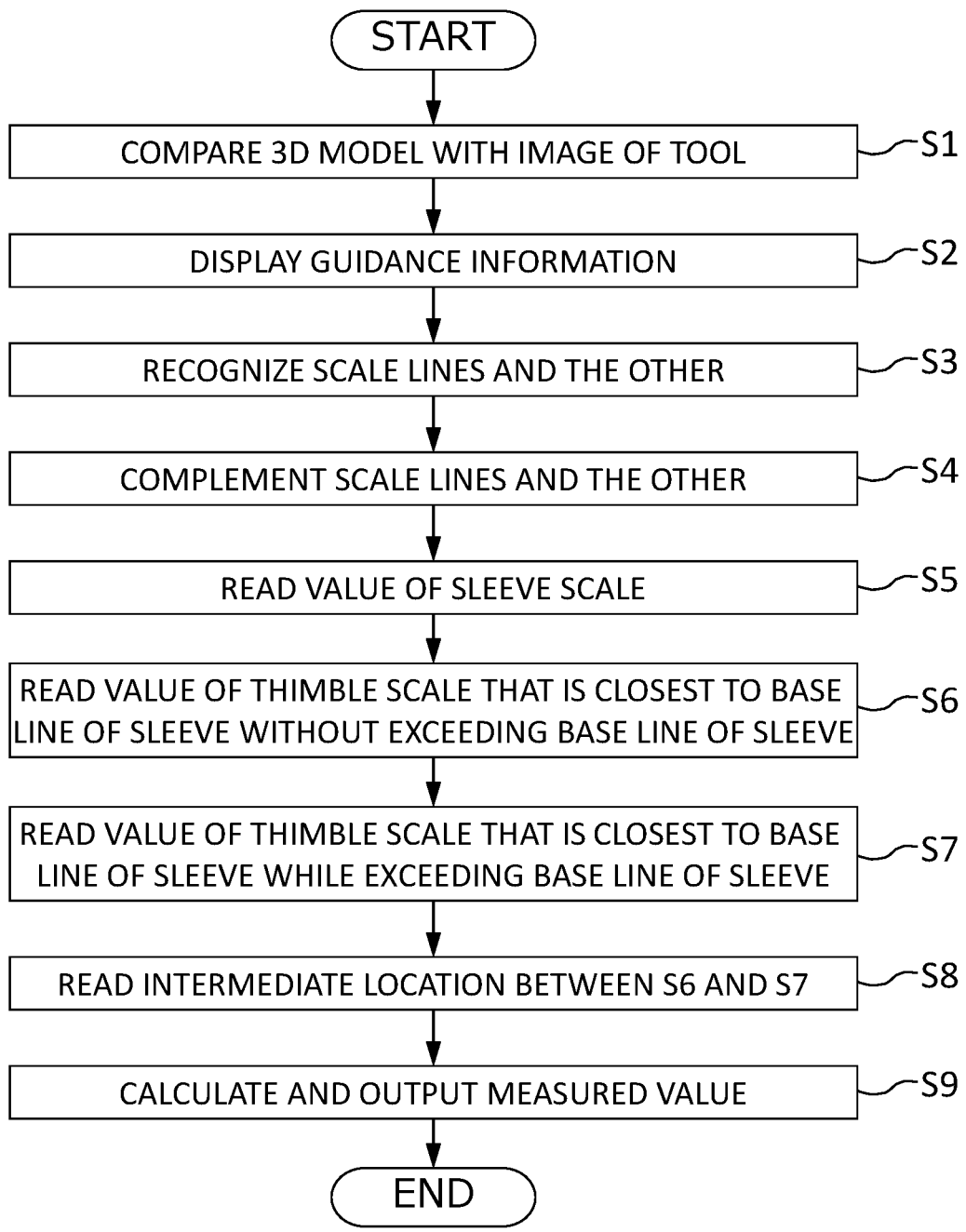
FIG. 2 is a flowchart illustrating an operation of the apparatus for reading a value measured with an analog measuring tool, according to an example 1 (reading of an analog micro-meter).

The example 1 is directed to an example, in which the apparatus 100 for reading a value measured with an analog measuring tool reads a measured value of an analog micrometer. Operations of the apparatus 100 for reading a value measured with an analog measuring tool according to the example 1 will be described below with reference to the flowchart of FIG. 2.

S1: A user measures dimensions of an object to be measured using an analog micro-meter. The imaging unit 110 captures an image of an outer appearance of the analog micro-meter indicating a measurement result. At this time, the display unit 120 may display a captured image, that is, an image of the analog micro-meter, which is being captured by a camera in real-time.

Next, the 3D matching unit 140 obtains one or more 3D models of analog measuring tools from the 3D model retaining unit 130, and compares each of the 3D models with the captured image obtained in S1. When a 3D model matching the captured image is found, the process goes to S2. Otherwise, the process of S1 is repeatedly performed.

S2: The guidance unit 150 overlaps the 3D model with the analog measuring tool included in the captured image. At this time, the display unit 120 may display the 3D model overlapping with the captured image, but may not essentially display it. The guidance unit 150 detects a difference between the model coordinate system of the 3D model and the global coordinate system, and displays guidance information for eliminating the difference (arrow or the like indicating a moving or rotating direction of the analog measuring tool) on the display unit 120.

S3: The measured value reading unit 160 recognizes scale lines and numbers in a predetermined region of the captured image. When reading of the measured value is performed in the global coordinate system, orientations of the recognized scale lines and numbers is corrected so that a deviation between the model coordinate system and the global coordinate system becomes substantially 0. In this case, the measured value reading unit 160 may automatically correct the captured image when the deviation between the model coordinate system and the global coordinate system is within a predetermined range.

S4: The measured value reading unit 160 restores scale lines and numbers that should have been represented originally with reference to the 3D model, when some scales and numbers of the captured image are not recognizable due to dirt or the like. In addition, when some of the scales and numbers in the captured image may not be recognized by the measured value reading unit 160 due to dirt or the like, the guidance unit 150 may notify this to be used properly.

S5: The measured value reading unit 160 reads the measured value based on the scale lines and numbers recognized from the captured image. In the case of the analog micro-meter, the measured value may be obtained by reading a sleeve scale M1 assigned with every 1 mm and a thimble scale M2 assigned with every 0.01 mm (see FIG. 3).

The measured value reading unit 160 reads a value of the sleeve. This will be described in detail with reference to FIG. 3. The measured value reading unit 160 recognizes a maximum value of the number recognizable from the sleeve ("5" in FIG. 3) and the number of scale lines at a right side of the number (two in FIG. 3). A value "7" (5+2) obtained by adding the above two numbers is the sleeve reading.

S6: Next, the measured value reading unit 160 reads a thimble value. In detail, a scale line L1 of the thimble that is closest to a base line B of the sleeve without exceeding the base line B of the sleeve (that is, on a lower portion), and a scale line L2 of the thimble, which is closest to the base line B of the sleeve while exceeding the base line B of the sleeve (that is, on an upper portion), are read. In addition, a distance and a ratio between L1 and B and a distance between L2 and B are respectively calculated. Finally, the reading of the sleeve is performed in units of 0.001 mm based on the reading of L1, reading of L2, and the above ratio.

The measured value reading unit 160 specifies the scale line L1 of the thimble, which is closest to the base line B of the sleeve without exceeding the base line B of the sleeve (that is, on the lower portion). A number at a location that is equal to or lower than the scale line L1 (that is, on the lower portion) and closest to the scale line L1 ("35" in FIG. 3) and the number of scale lines between the scale line L1 and the above number (two in FIG. 3) are recognized. In addition, the above two numbers are added (37=35+2). Since the thimble has a scale of 0.01 mm, the above number indicates 0.37. This is reading of the scale line L1.

S7: The measured value reading unit 160 specifies the scale line L2 of the thimble, which is closest to the base line B of the sleeve while exceeding the base line B of the sleeve (that is, on the upper portion). Since the thimble has a scale of 0.01 mm unit, the reading of L2 is 0.38.

S8: The measured value reading unit 160 calculates the distance and the ratio between L1 and B and the distance and the ratio between L2 and B. Assuming that the ratio therebetween is 1:9, the reading of the thimble is 0.371 (reading of L1 0.37+0.001).

S9: The measured value reading unit 160 adds the reading of sleeve "7" and the reading of thimble 0.371 to obtain a measured value 7.371. The measured value output unit 170 outputs the measured value to outside as a measurement result. For example, when the measurement result is output to the display unit 120, the display unit 120 displays characters indicating the measurement result overlapping with the current image.

Example 2

Figure 4:
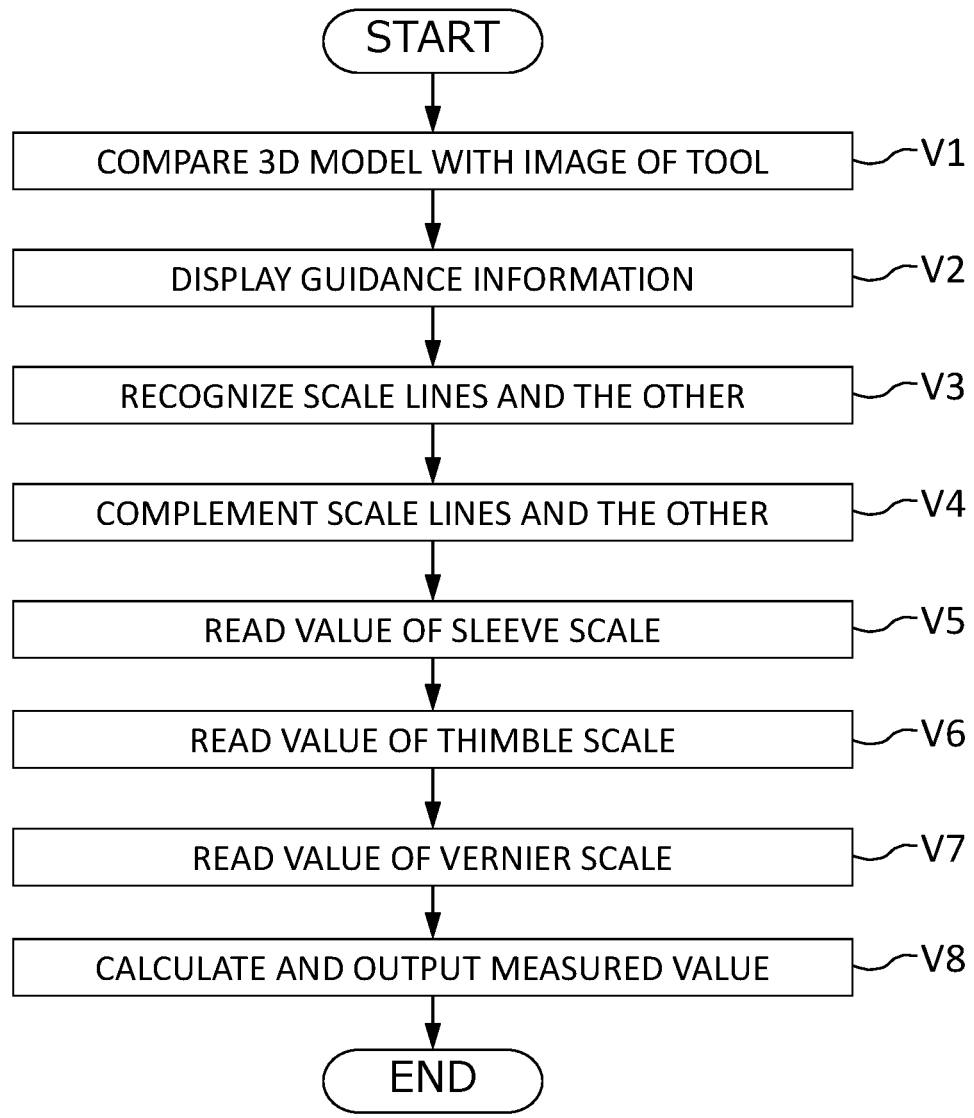
FIG. 4 is a flowchart illustrating an operation of an apparatus for reading a value measured with an analog measuring tool according to an example 2 (reading of an analog micro-meter with a vernier).

The example 2 is directed to an example, in which the apparatus 100 for reading a value measured with an analog measuring tool reads a measured value of an analog micro-meter with a vernier. Operations of the apparatus 100 for reading a value measured with an analog measuring tool according to the example 2 will be described below with reference to the flowchart of FIG. 4.

V1: Like in S1 of the example 1, the imaging unit 110 captures an image of an analog micro-meter with a vernier, on which a measurement result is indicated. The 3D matching unit 140 compares each of 3D models obtained from the 3D model retaining unit 130 with the captured image obtained in V1. When a 3D model matching the captured image is found, the process goes to V2. Otherwise, the process of V1 is repeatedly performed.

Figure 3:
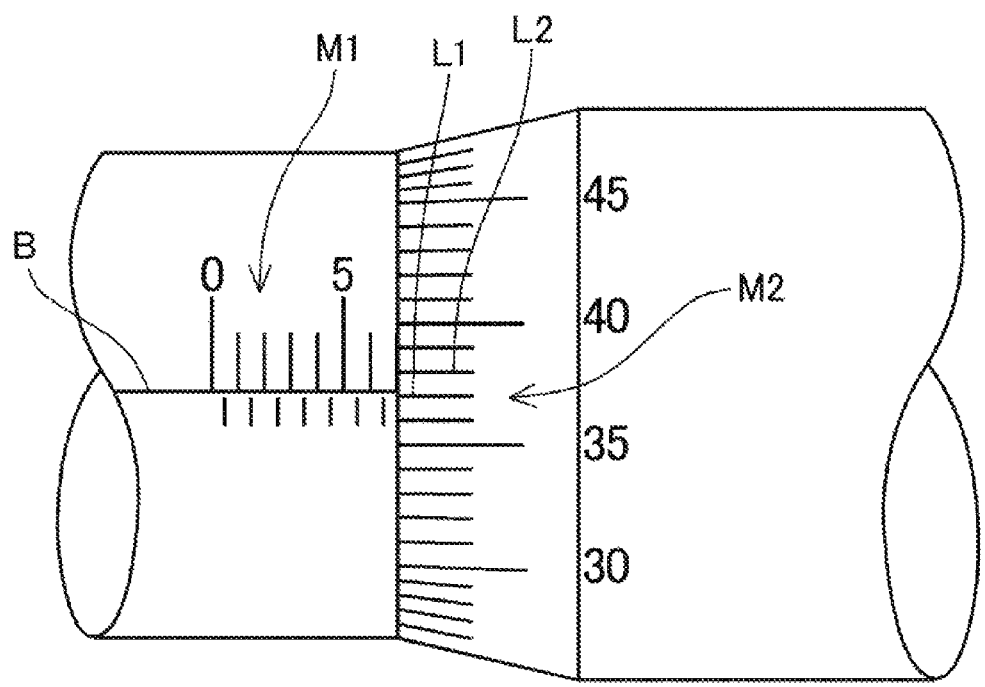
FIG. 3 is a diagram of a shape of an analog micro-meter.
Figure 5:
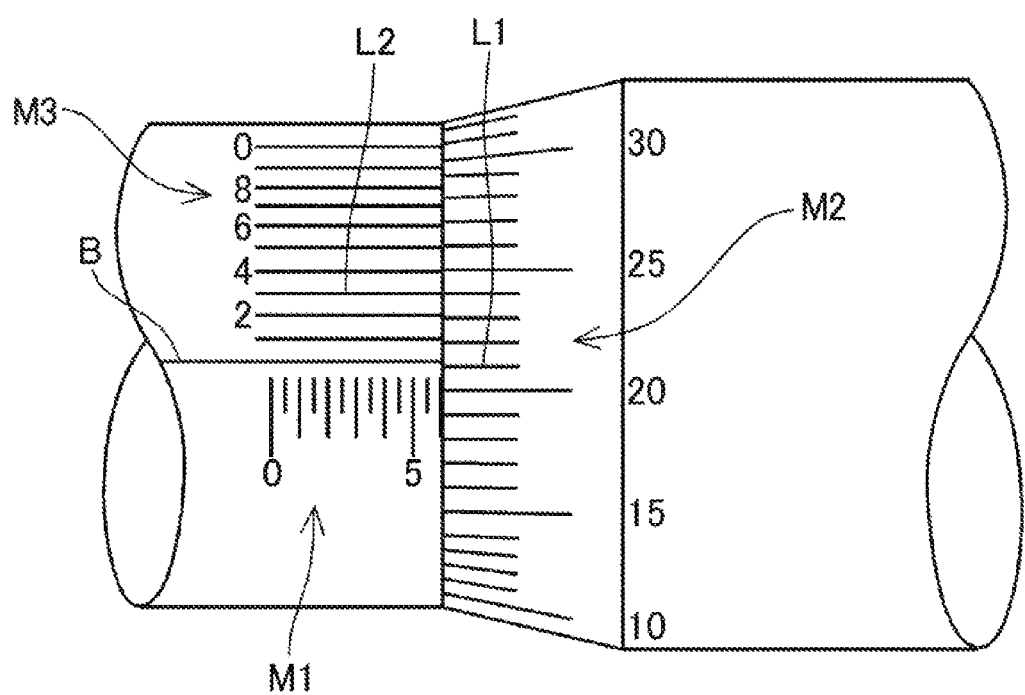
FIG. 5 is a diagram of a shape of an analog micro-meter with a vernier.

The analog micro-meter according to the example 1 and the analog micro-meter with the vernier according to the example 2 can be distinguished from each other according to a direction of a scale line on the sleeve from an outer appearance. That is, as shown in FIG. 3, the analog micro-meter according to the example 1 has the scale lines on an upper portion of the base line of the sleeve. Meanwhile, as shown in FIG. 5, the analog micro-meter with the vernier according to the example 2 has the scale lines on a lower portion of the base line of the sleeve. When the 3D model retaining unit 130 retains, for example, the above scale line shape as a part of characteristics of the 3D models, the 3D matching unit 140 can distinguish the analog micro-meter according to the example 1 from the analog micro-meter with the vernier according to the example 2.

V2: Like in S2 of the example 1, the guidance unit 150 causes the 3D model to overlap with the analog measuring tool included in the captured image. In addition, the guidance unit 150 detects a difference between the model coordinate system of the 3D model and the global coordinate system, and displays guidance information for eliminating the difference (arrow or the like indicating a moving or rotating direction of the analog measuring tool) on the display unit 120.

V3: Like in S3 of the example 1, the measured value reading unit 160 recognizes scale lines and numbers in a predetermined region of the captured image.

V4: Like in S4 of the example 1, the measured value reading unit 160 restores scale lines and numbers that should have been represented originally with reference to the 3D model, when some of the scales and numbers of the captured image cannot be recognized due to dirt or the like.

V5: The measured value reading unit 160 reads the measured value based on the scale lines and numbers recognized from the captured image. In the case of the analog micro-meter with the vernier, the measured value is obtained by reading a sleeve scale M1 assigned at every 1 mm, a thimble scale M2 assigned at every 0.01 mm, and a vernier scale M3 assigned at every 0.001 mm (see FIG. 5).

The measured value reading unit 160 reads a value of the sleeve. This will be described in detail with reference to FIG. 5. The measured value reading unit 160 recognizes a maximum value of the number recognizable from the sleeve ("5" in FIG. 5) and the number of scale lines at a right side of the number (one in FIG. 5). A value "6" (5+1) obtained by adding the above two numbers is the sleeve reading.

V6: Next, the measured value reading unit 160 reads a thimble value. The measured value reading unit 160 specifies the scale line L1 of the thimble, which is closest to the base line B of the sleeve without exceeding the base line B of the sleeve (that is, on the lower portion). A number at a location equal to or lower than the scale line L1 (that is, on the lower portion) and closest to the scale line L1 ("20" in FIG. 5) and the number of scale lines between the scale line L1 and the above number (one in FIG. 5) are recognized. In addition, the above two numbers are added (21=20+1). Since the thimble has a scale of 0.01 mm unit, the above number indicates 0.21. This is reading of the scale line L1.

V7: Next, the measured value reading unit 160 specifies a scale line L2 of the vernier, which coincides with one scale of the thimble, and reads a value of the scale line L2. In detail, the measured value reading unit 160 obtains a deviation amount (distance) between each of all scale lines of the vernier included in the captured image and the thimble scale closest to the corresponding vernier scale. In addition, vernier scales each having a deviation amount equal to or less than a predetermined critical value (an upper limit of a value at which the deviation amount may be regarded as 0) is extracted, and the vernier scale having a smallest value (that is, at the lowermost portion) from among the vernier scales is specified as L2. Here, when there is no vernier scale having the deviation amount equal to or less than the predetermined critical value, the vernier scale having the smallest deviation amount is specified as L2.

The measured value reading unit 160 recognizes a number closest to the scale line L2 and equal to or less than the scale line L2 (that is, lower portion) ("2" in FIG. 5) and the number of scales between the scale line L1 and the above number (one in FIG. 5). In addition, the above two numbers are added (3=2+1). Since the vernier has a scale of 0.001 mm unit, the above number indicates 0.003. This is the reading of the scale line L2.

V8: The measured value reading unit 160 obtains the measured value "6.213" by adding the reading of sleeve "6", the reading of thimble "0.21", and the reading of vernier "0.003". Like in S9 of the example 1, the measured value output unit 170 outputs the measured value to outside as a measurement result.

Example 3

Figure 6:
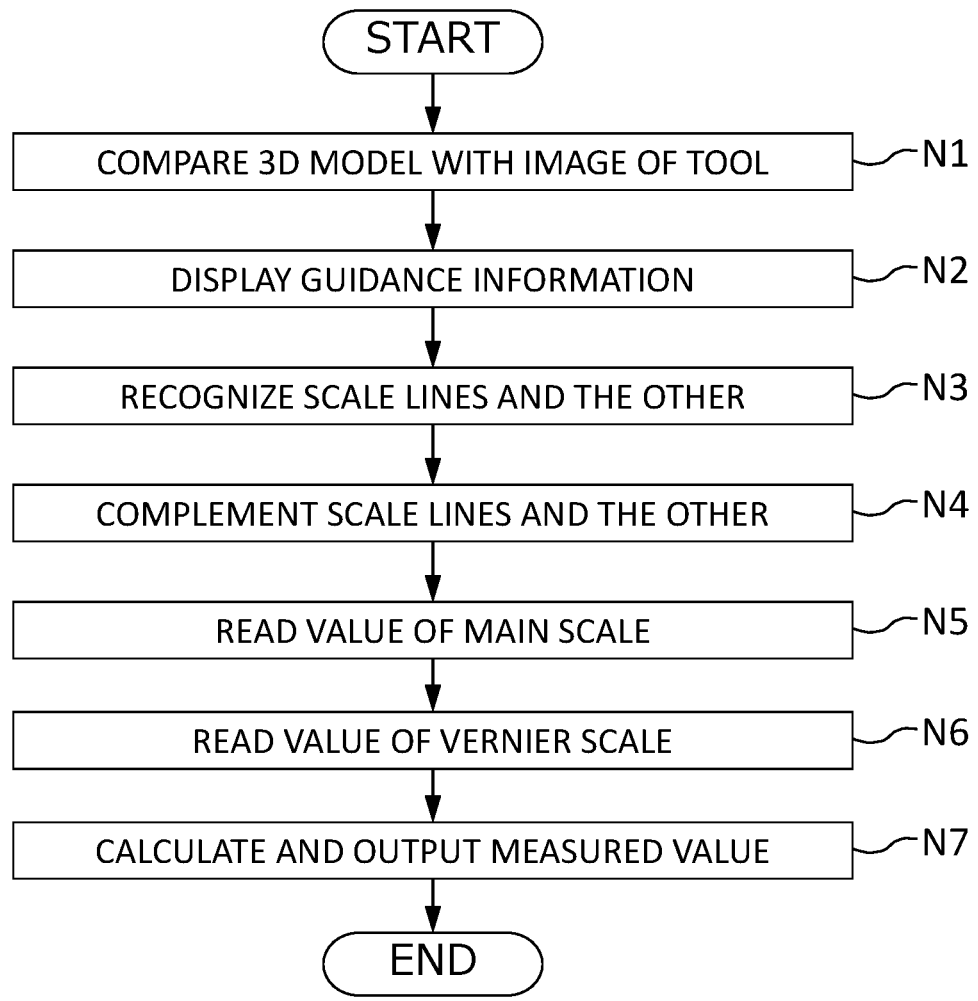
FIG. 6 is a flowchart illustrating an operation of an apparatus for reading a value measured with an analog measuring tool according to an example 3 (reading of an analog caliper).

The example 3 is directed to an example, in which the apparatus 100 for reading a value measured with an analog measuring tool reads a measured value of an analog caliper. Operations of the apparatus 100 for reading a value measured with an analog measuring tool according to the example 3 will be described below with reference to the flowchart of FIG. 6.

N1: Like in S1 of the example 1, the imaging unit 110 captures an image of an outer appearance of an analog caliper on which a measured result is indicated. The 3D matching unit 140 compares each of 3D models obtained from the 3D model retaining unit 130 with the captured image obtained in N1. When a 3D model matching the captured image is found, the process goes to N2. Otherwise, the process of N1 is repeatedly performed.

N2: Like in S2 of the example 1, the guidance unit 150 causes the 3D model to overlap with the analog measuring tool included in the captured image. In addition, the guidance unit 150 detects a difference between the model coordinate system of the 3D model and the global coordinate system, and displays guidance information for eliminating the difference (arrow or the like indicating a moving or rotating direction of the analog measuring tool) on the display unit 120.

N3: Like in S3 of the example 1, the measured value reading unit 160 recognizes scale lines and numbers in a predetermined region of the captured image.

N4: Like in S4 of the example 1, the measured value reading unit 160 restores scale lines and numbers that should have been represented originally with reference to the 3D model, when some of the scales and numbers of the captured image cannot be recognized due to dirt or the like.

N5: The measured value reading unit 160 reads the measured value based on the scale lines and numbers recognized from the captured image. In the case of the analog caliper, the measured value is obtained by reading a main scale M1 assigned at every 1 mm and a vernier scale M2 assigned at every 0.05 mm (see FIG. 7).

The measured value reading unit 160 reads a value of the main scale. This will be described in detail with reference to FIG. 7. The measured value reading unit 160 specifies a scale line L1 of the main scale, wherein the scale line L1 is closest to a scale 0 of the vernier without exceeding a scale 0 of the vernier (that is, at a left side). A number whose location is equal to or lower than the scale line L1 (that is, at the left side) and closest to the scale line L1 ("10" in FIG. 7) and the number of scale lines between the scale line L1 and the above number (six in FIG. 7) are recognized. In addition, the above two numbers are added (16=10+6). Since the main scale has a scale of 1 mm unit, the scale line L1 is read as "16".

N6: Next, the measured value reading unit 160 specifies a scale line L2 of the vernier, wherein the scale line L2 matches any of the main scale, and reads a value of the scale line L2. In detail, the measured value reading unit 160 obtains a deviation amount (distance) between each of scale lines of the vernier included in the captured image and a scale of the main scale closest to the corresponding vernier scale. In addition, vernier scales each having a deviation amount equal to or less than a predetermined critical value (an upper limit of a value at which the deviation amount may be regarded as 0) are extracted, and the vernier scale having a smallest value (that is, at the lowermost portion) from among the vernier scales is specified as L2. Here, when there is no vernier scale having the deviation amount equal to or less than the predetermined critical value, the vernier scale having the smallest deviation amount is specified as L2.

Figure 7:
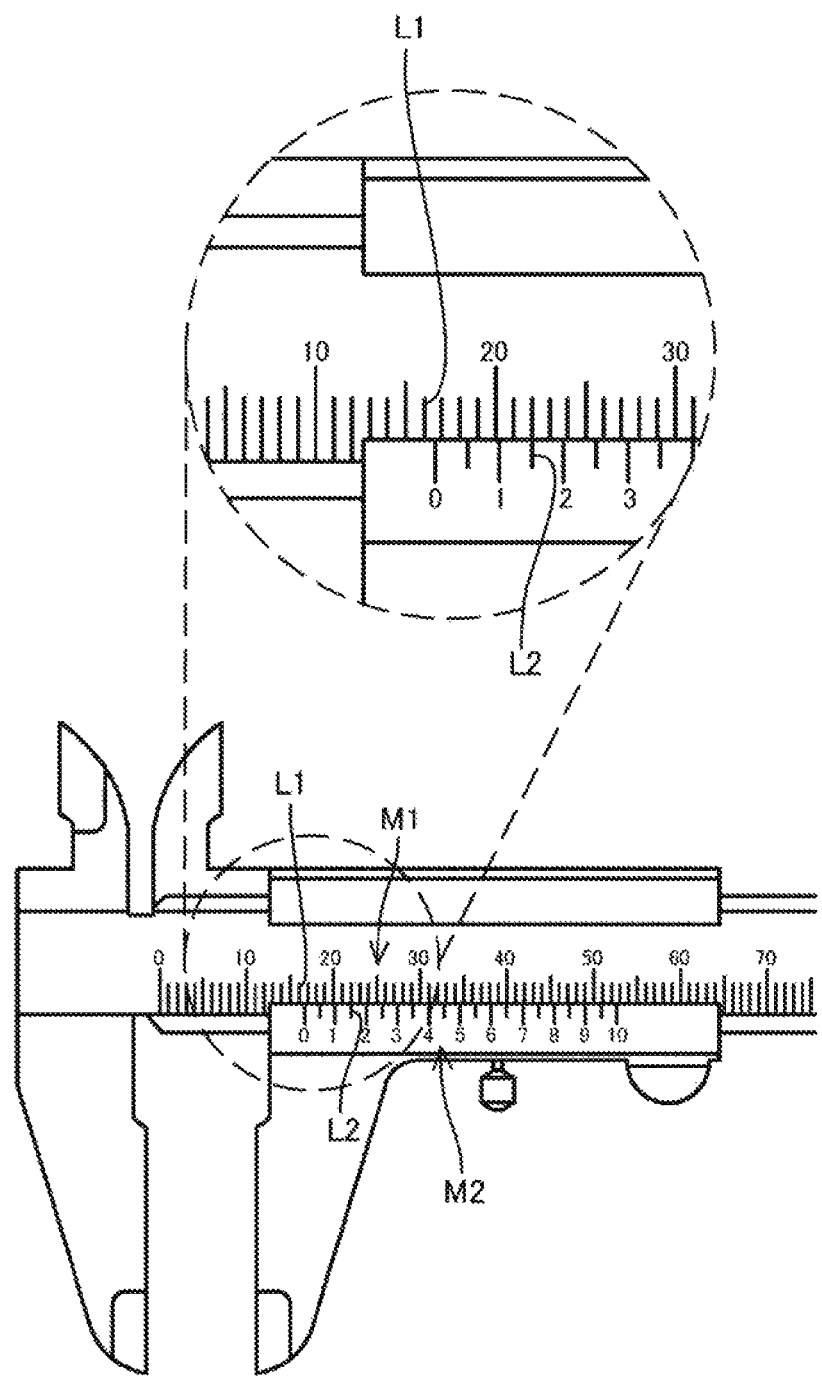
FIG. 7 is a diagram of a shape of an analog caliper.

The measured value reading unit 160 recognizes a number closest to the scale line L2 and equal to or less than the scale line L2 (that is, at the left side) ("1" in FIG. 7) and the number of scales between the scale line L1 and the above number (one in FIG. 7). Since the vernier has a scale of 0.05 mm unit, one scale corresponds to 0.05 (mm), and a number incremented for every two scales is, "1", and corresponds to "0.1" (mm). That is, the scale line L2 is read as "0.15".

N7: The measured value reading unit 160 obtains a measured value "16.15" by adding the reading of the main scale "16" and the reading of the vernier "0.15". Like in S9 of the example 1, the measured value output unit 170 outputs the measured value to outside as a measurement result.

Example 4

Figure 8:
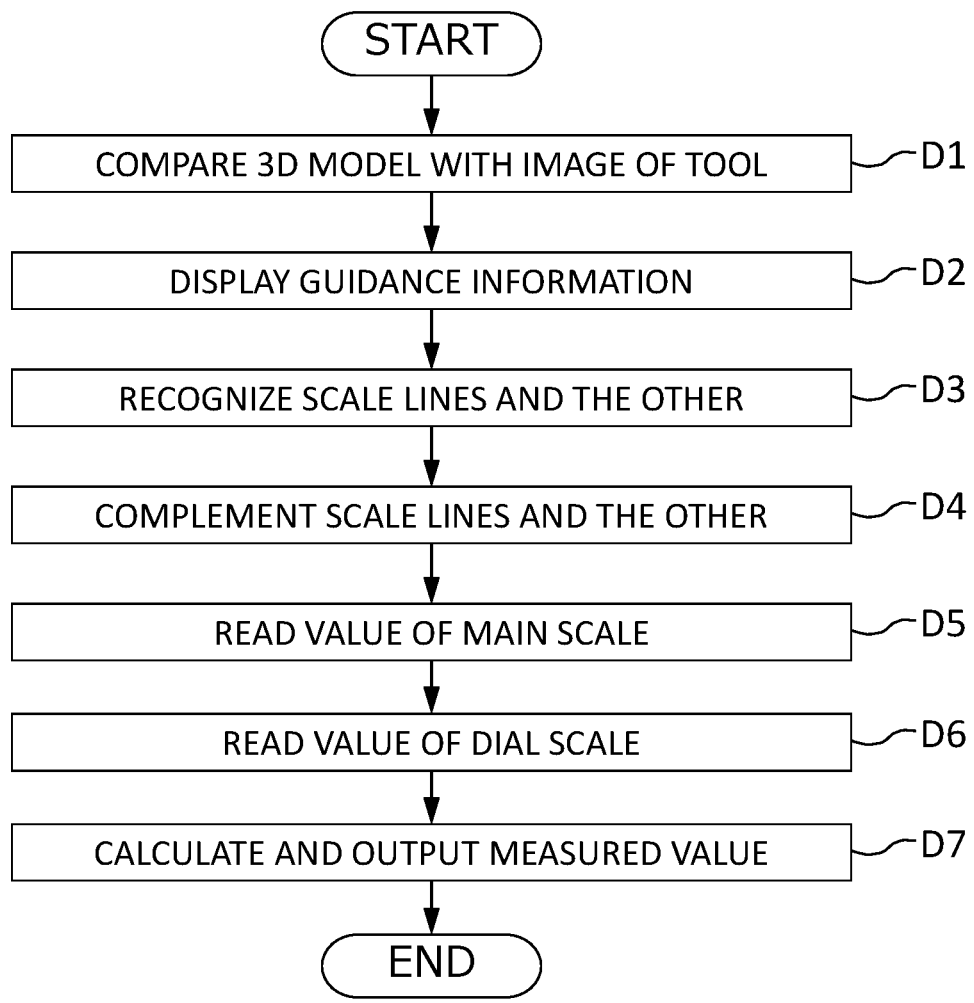
FIG. 8 is a flowchart illustrating an operation of an apparatus for reading a value measured with an analog measuring tool according to an example 4 (reading of an analog dial caliper).

The example 4 is directed to an example, in which the apparatus 100 for reading a value measured with an analog measuring tool reads a measured value of an analog dial caliper. Operations of the apparatus 100 for reading a value measured with an analog measuring tool according to the example 4 will be described below with reference to the flowchart of FIG. 8.

D1: Like in S1 of the example 1, the imaging unit 110 captures an image of an outer appearance of an analog dial caliper on which a measured result is indicated. The 3D matching unit 140 compares each of 3D models obtained from the 3D model retaining unit 130 with the captured image obtained in D1. When a 3D model coinciding with the captured image is found, the process goes to D2. Otherwise, the process of D1 is repeatedly performed.

D2: Like in S2 of the example 1, the guidance unit 150 causes the 3D model to overlap with the analog measuring tool included in the captured image. In addition, the guidance unit 150 detects a difference between the model coordinate system of the 3D model and the global coordinate system, and displays guidance information for eliminating the difference (arrow or the like indicating a moving or rotating direction of the analog measuring tool) on the display unit 120.

D3: Like in S3 of the example 1, the measured value reading unit 160 recognizes scale line numbers and a pointer in a predetermined region of the captured image.

D4: Like in S4 of the example 1, the measured value reading unit 160 restores scale lines and numbers that should have been represented originally with reference to the 3D model, when some of the scales and numbers of the captured image cannot be recognized due to dirt or the like.

Figure 9:
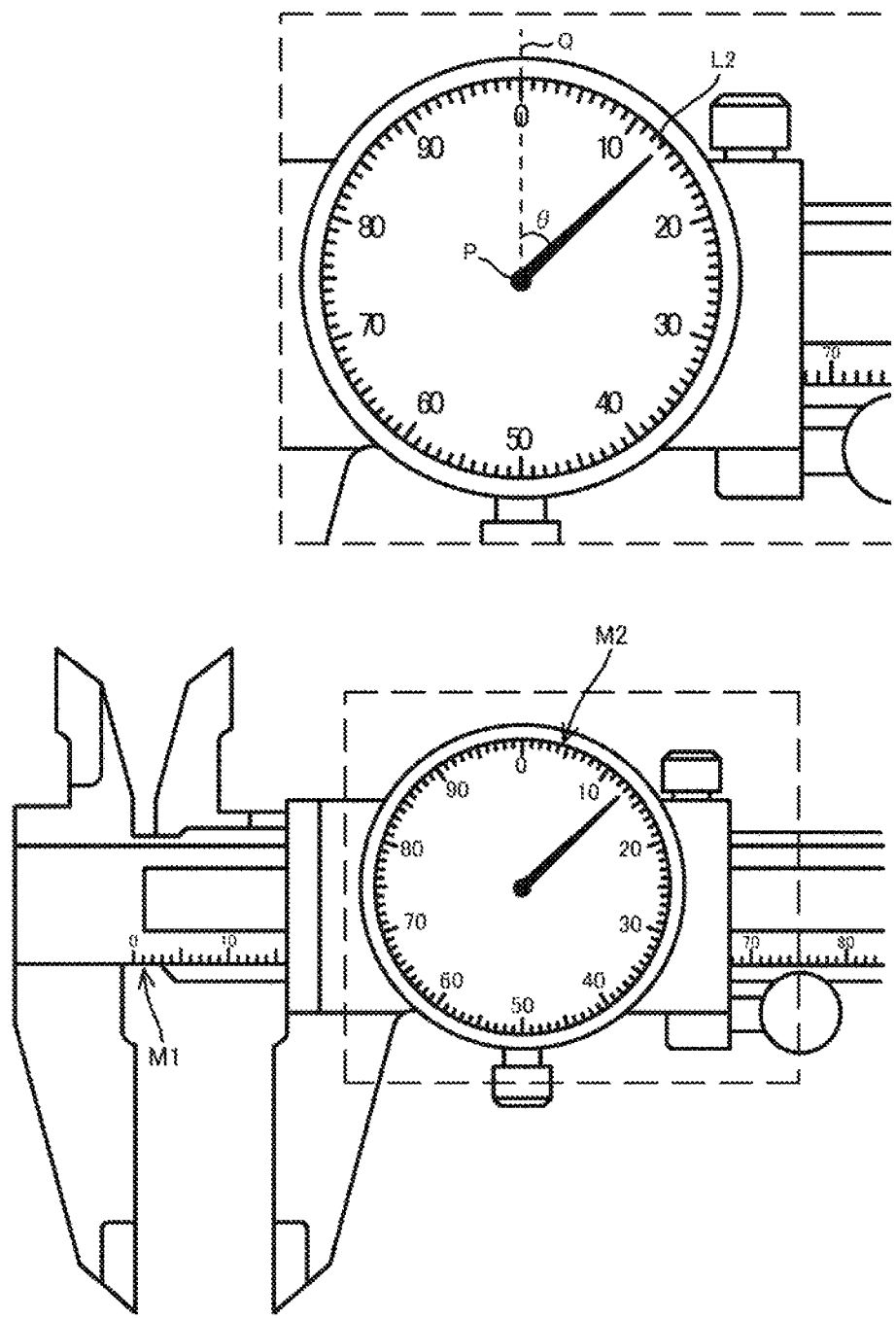
FIG. 9 is a diagram of a shape of an analog dial caliper.

D5: The measured value reading unit 160 reads the measured value based on the scale lines and numbers recognized from the captured image. In the case of the dial caliper, the measured value is obtained by reading a main scale M1 assigned at every 1 mm and a dial scale M2 assigned at every 0.01 mm on a boundary of a scale plate (see FIG. 9).

The measured value reading unit 160 reads a value of the main scale. This will be described in detail with reference to FIG. 9. The measured value reading unit 160 recognizes a maximum value of the number recognizable from the main scale at a left region of the scale plate ("10" in FIG. 9) and the number of scale lines at a right side of the number (six in FIG. 9). A value "16" (10+6) obtained by adding the above two numbers is the reading of the main scale.

D6: Next, the measured value reading unit 160 specifies a value of a dial scale indicated by a pointer on the scale plate. The measured value reading unit 160 defines a line segment Q connecting a scale 0 corresponding to 12 o clock position and a rotating center P of the pointer. In addition, an angle θ between the line segment Q and the pointer is obtained. In the present embodiment, the angle θ is 46.8. Next, the measured value reading unit 160 obtains a rotary angle of the pointer per one scale. In the present embodiment, since one round of 360 degrees is divided by 100 scales in the scale plate, an angle per one scale is 3.6 □. In addition, the measured value reading unit 160 calculates the scale value indicated by the pointer based on the angle θ and the rotary angle of the pointer per one scale. In this example, the scale value indicated by the pointer is θ/3.6=46.8/3.6=13. Since one scale of the scale plate indicates 0.01 mm, the reading of the scale plate becomes 0.13.

D7: The measured value reading unit 160 obtains the measured value "16.13" by adding the reading of main scale "16" and the reading of the scale plate "0.13". Like in S9 of the example 1, the measured value output unit 170 outputs the measured value to outside as a measurement result.

Example 5

An analog dial gauge is not only used to read a measured value, but is also used as a comparative measuring device that measures a deviation degree from a reference by using an amplitude (vibration amount) and its direction (clockwise (CW) or counter-clockwise (CCW)). For example, by rotating a cylinder while the analog dial gauge is in contact with an outer circumference of the cylinder, a roundness, misalignment, deflection, etc. of the cylinder can be grasped. That is, the analog dial gauge is likely to be used to grasp whether a variation amount of the measured value (vibration amount) is greater or smaller than a predetermined limit, rather than to grasp the measured value itself.

Figure 10:
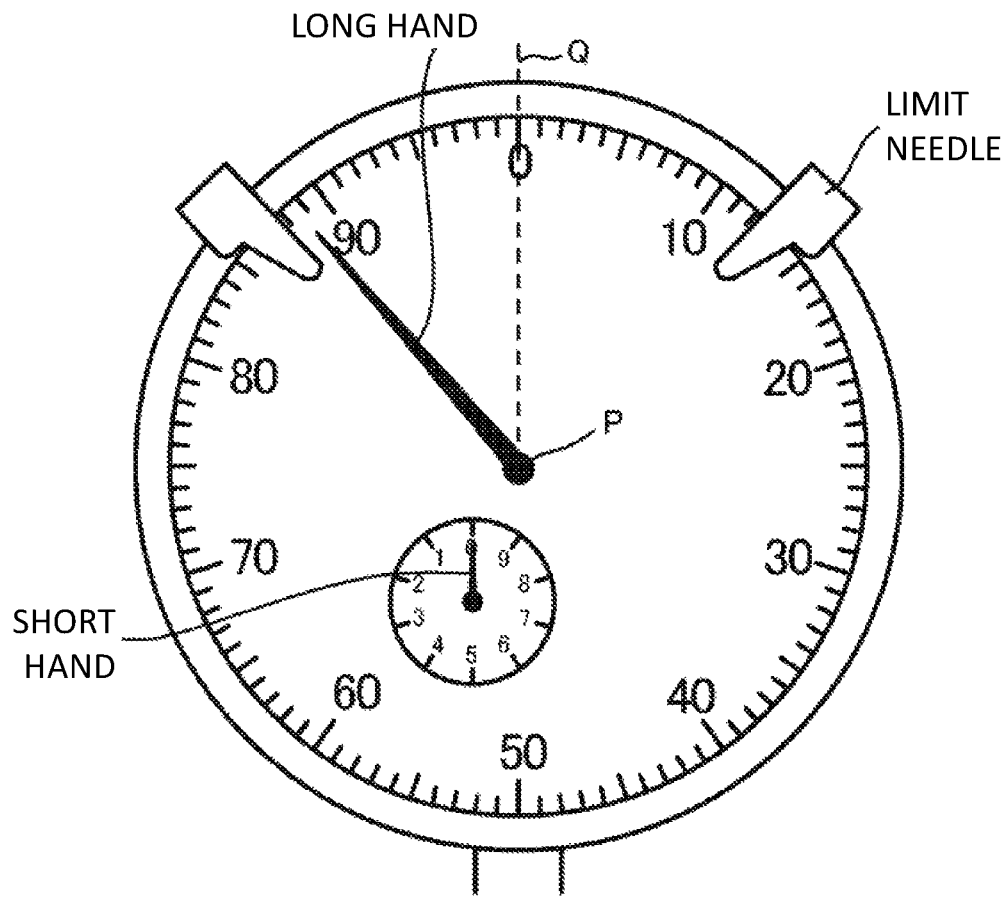
FIG. 10 is a diagram showing a shape of an analog dial gauge.

As shown in FIG. 10, a typical analog dial gauge includes a long hand, a short hand, and a limit needle. The limit needle indicates a limit in the vibration amount, which is set in advance by a user, and judgement such as pass or fail is made according to whether the long hand vibrates within a region indicated by the limit needle. Even a beginner can promptly perform the judgement.

On the other hand, it is not easy to read a measured value of the analog dial gauge. Since the analog dial gauge may include various kinds of scales such as a continuous scale, a balance scale, a reverse scale, etc. and a reading method differs in each of the scales, it takes a long time to perform a reading operation. In a case of a multiple rotation type dial gauge, a mistake in reading the measured value is likely to occur due to an error of reading the revolution number. Further, when the roundness of the cylinder is measured while rotating by using the analog dial gauge, it is difficult to accurately read the measured value because the long hand swings continuously. Although a digital measuring tool may have a peak hold function that maintains a peak (maximum) measured value, in the case of the analog dial gauge, a measurer has to read the measured value with the eye. Therefore, it is very difficult to judge the measurement result only by rotating the circumference of the cylinder once, and measurements have to be performed a plurality of times, which results in increase in the measuring time.

Figure 11:
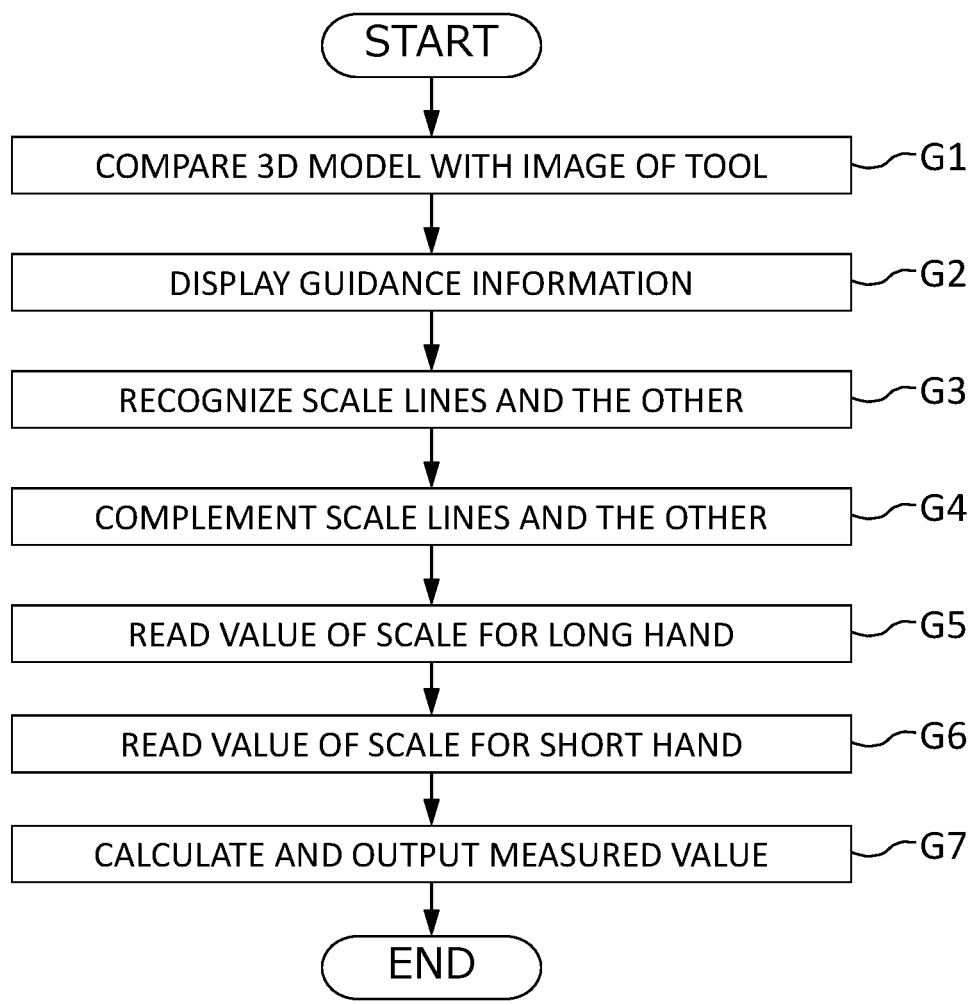
FIG. 11 is a flowchart illustrating an operation of an apparatus for reading a value measured with an analog measuring tool according to an example 5 (reading of an analog dial gauge).

The example 5 relates to an example, in which the apparatus 100 for reading a value measured with an analog measuring tool reads the measured value of the analog dial gauge. Operations of the apparatus 100 for reading a value measured with an analog measuring tool according to the example 5 will be described below with reference to the flowchart of FIG. 11.

G1: Like in S1 of the example 1, the imaging unit 110 captures an image of an outer appearance of an analog dial gauge on which a measured result is indicated. The 3D matching unit 140 compares each of 3D models obtained from the 3D model retaining unit 130 with the captured image obtained in G1. When a 3D model matching the captured image is found, the process goes to G2. Otherwise, the process of G1 is repeatedly performed.

There are a plurality of models in analog dial gauges that are different from one another in presence of a short hand, a kind of a scale, a minimum scale amount, etc. Thus, the apparatus 100 for reading the measured value of the analog measuring tool may include a unit for setting information about a model of the analog dial gauge in advance. The apparatus 100 for reading the measured value of the analog measuring tool may store in advance information such as a 3D model, presence of a short hand, a kind of the scale, a minimum scale amount, etc. in correspondence with the model information, in the memory unit. For example, the apparatus 100 for reading a value measured with an analog measuring tool can allow a user to input or select the model information via an input unit that is not shown. When the model information is set, the apparatus 100 for reading a value measured with an analog measuring tool obtains, from the memory unit, the 3D model, presence of a short hand, a kind of the scale, a minimum scale amount, etc. corresponding to the model information.

G2: Like in S2 of the example 1, the guidance unit 150 causes the 3D model to overlap with the analog measuring tool included in the captured image. In addition, the guidance unit 150 detects a difference between the model coordinate system of the 3D model and the global coordinate system, and displays guidance information for eliminating the difference (arrow or the like indicating a moving or rotating direction of the analog measuring tool) on the display unit 120.

G3: Like in S3 of the example 1, the measured value reading unit 160 recognizes scale lines, numbers and a pointer in a predetermined region of the captured image.

G4: Like in S4 of the example 1, when some of the scales and numbers of the captured image cannot be recognized due to dirt or the like the measured value reading unit 160 restores scale lines and numbers that should have been represented originally with reference to the 3D model.

Figure 12:
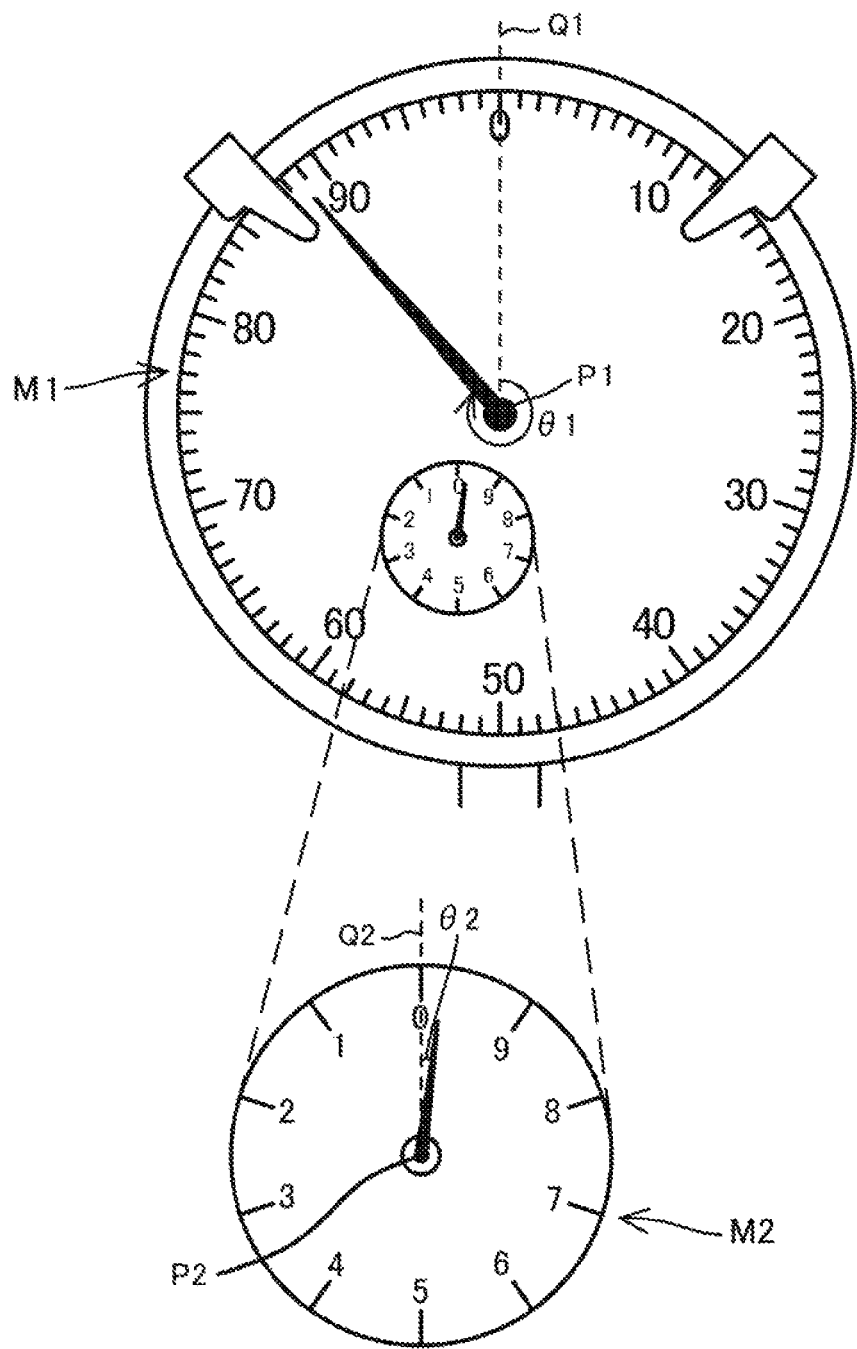
FIG. 12 is a diagram showing a shape of an analog dial gauge.

G5: The measured value reading unit 160 reads the measured value based on the scale lines and numbers recognized from the captured image. In the case of the analog dial gauge, the measured value may be obtained by reading long hand scales M1 assigned at every predetermined scale value R1 mm and short hand scales M2 assigned at every predetermined scale value R2 mm (see FIG. 12).

The measured value reading unit 160 reads a value of the long hand scale. This will be described in detail with reference to FIG. 12. The measured value reading unit 160 defines a line segment Q1 connecting a scale 0 of the long hand scales corresponding to 12 o clock position and a rotating center P1 of the long hand. In addition, an angle θ1 between the line segment Q1 and the long hand is obtained. Next, the measured value reading unit 160 obtains a rotary angle of the long hand per one scale. In addition, the measured value reading unit 160 divides the angle θ1 by a rotary angle of the long hand one scale to calculate a value of the scale indicated by the long hand. A value that is obtained by multiplying the above value of the scale by the minimum scale of the long hand (the number obtained in G1) is reading of the scale plate.

G6: Next, the measured value reading unit 160 reads a value of a scale of the short hand. The measured value reading unit 160 defines a line segment Q2 connecting a scale 0 of the short hand scales corresponding to 12 o clock position and a rotating center P2 of the short hand. In addition, an angle θ2 between the line segment Q2 and the short hand is obtained. Next, the measured value reading unit 160 obtains a rotary angle of the short hand one scale. In addition, the measured value reading unit 160 divides the angle θ2 by a rotary angle of the short hand per one scale to calculate a value of the scale indicated by the short hand. A value that is obtained by multiplying the above value of the scale by the minimum scale amount of the short hand (the number obtained in G1) is reading of the scale plate.

G7: The measured value reading unit 160 obtains the measured value by adding the reading of long hand and the reading of short hand. Like in S9 of the example 1, the measured value output unit 170 outputs the measured value to outside as a measurement result.

In G5 and G6, the measured value reading unit 160 may be configured to read an intermediate value of vibration width of the long hand or the short hand. The reason is that it is often that a pointer needle of the analog dial gauge vibrates continuously, and a value indicated by the pointer needle at a certain moment is not necessarily said to be suitable as the measured value. Thus, the measured value reading unit 160 calculates the measured values of the long hand and the short hand a plurality of times at a predetermined time interval, within a predetermined period of time. A minimum value and a maximum value are extracted from among a plurality of measured values obtained as above, and an intermediate value between the minimum and maximum values is output as a measured result.

Example 6

It is convenient to store or plot continuous measurements of the analog dial gauge as electronic data. For example, conventionally, a skilled operator observes movements of the long hand and the short hand, and intuitively grasps a tendency in the measured values. However, when a variation tendency in the measured values may be digitized and visualized through an information processing, more accurate evaluation may be performed without depending on personal skills. According to the conventional measurement with the eye, a shape of an object to be measured was only recognized roughly. However, when a variation in the measured values can be plotted, the shape of the object to be measured can be more finely and continuously grasped and a designed value can be compared with a master's one. It is difficult to continuously read the measured values for a long period of time according to the reading by a person. When a long time measurement is wanted to be performed, there is a need to construct a large-scale measuring system using a displacement gauge or a vibration meter. However, when it is possible to automatically read the measured value of the analog dial gauge to obtain the measured values as data, a precise continuous measurement operation can be performed with low costs.

The example 6 relates to an example, in which the apparatus 100 for reading a value measured with an analog measuring tool performs image recognition of the analog dial gauge in real-time and outputs a measured value.

Figure 13:
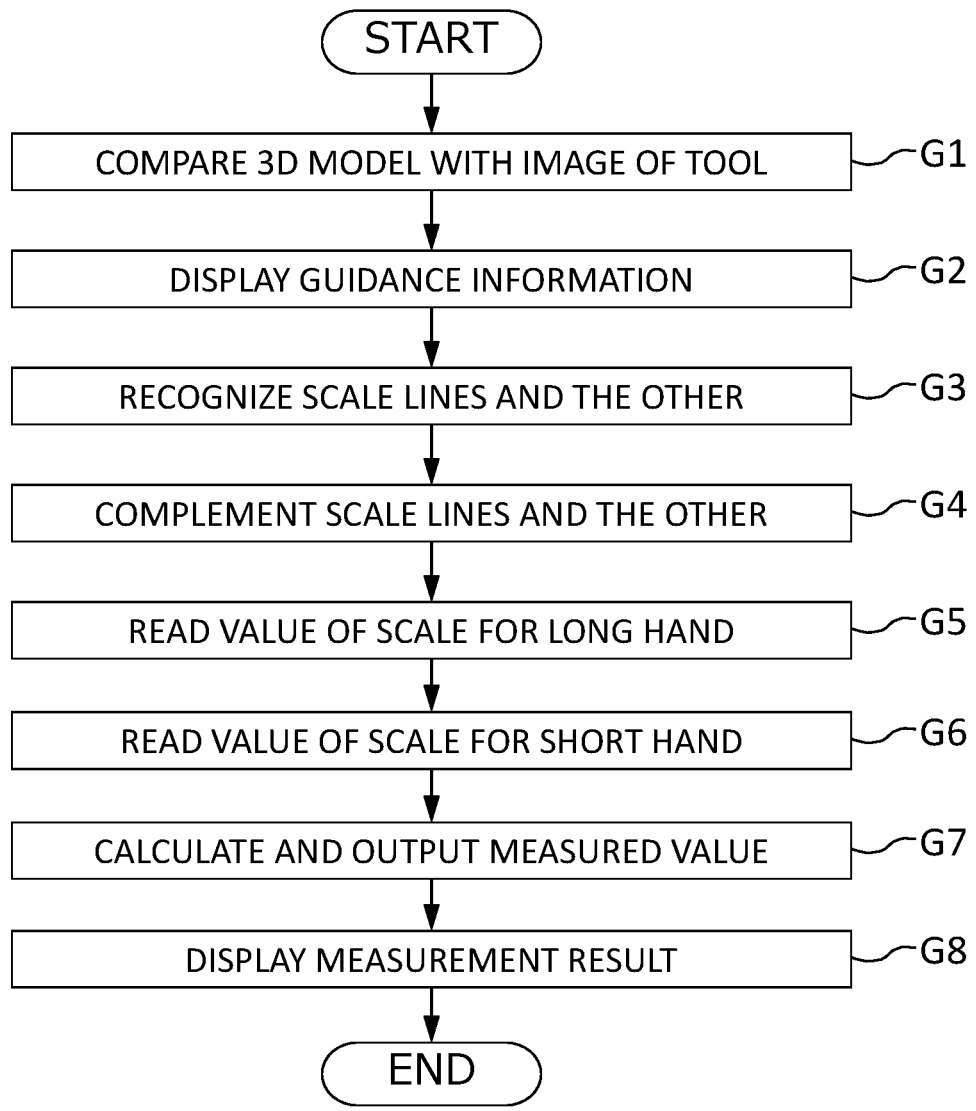
FIG. 13 is a flowchart illustrating an operation of an apparatus for reading a value measured with an analog measuring tool according to an example 6 (reading of an analog dial gauge).

Operations of the apparatus 100 for reading a value measured with an analog measuring tool according to the example 6 will be described below with reference to the flowchart of FIG. 13.

Steps G1 to G7: The apparatus 100 for reading the measured value of the analog measuring tool reads a measured value of the analog dial gauge and outputs it to outside as a measurement result, like in example 5. Here, the measured value reading unit 160 may continuously observe the measured value of the analog dial gauge, and may output instant values of the measured value at every predetermined time. Alternatively, a statistical value such as a median value may be calculated and output at every predetermined time.

Step G8: The measured value output unit 170 obtains a measurement result (instant value or median value of the measured values) output from the measured value reading unit 160 in real-time, that is, intermittently at regular time intervals. That is, the measured value output unit 170 receives a set of time-serial measurement result data. The measured value output unit 170 may plot the set of time-serial measurement result data, and may display a graph on the display unit 120 such as a display, etc. Alternatively, the set of data can be provided to the user in any kind of format, such as a simple list.

Example 6-1

Figure 14:
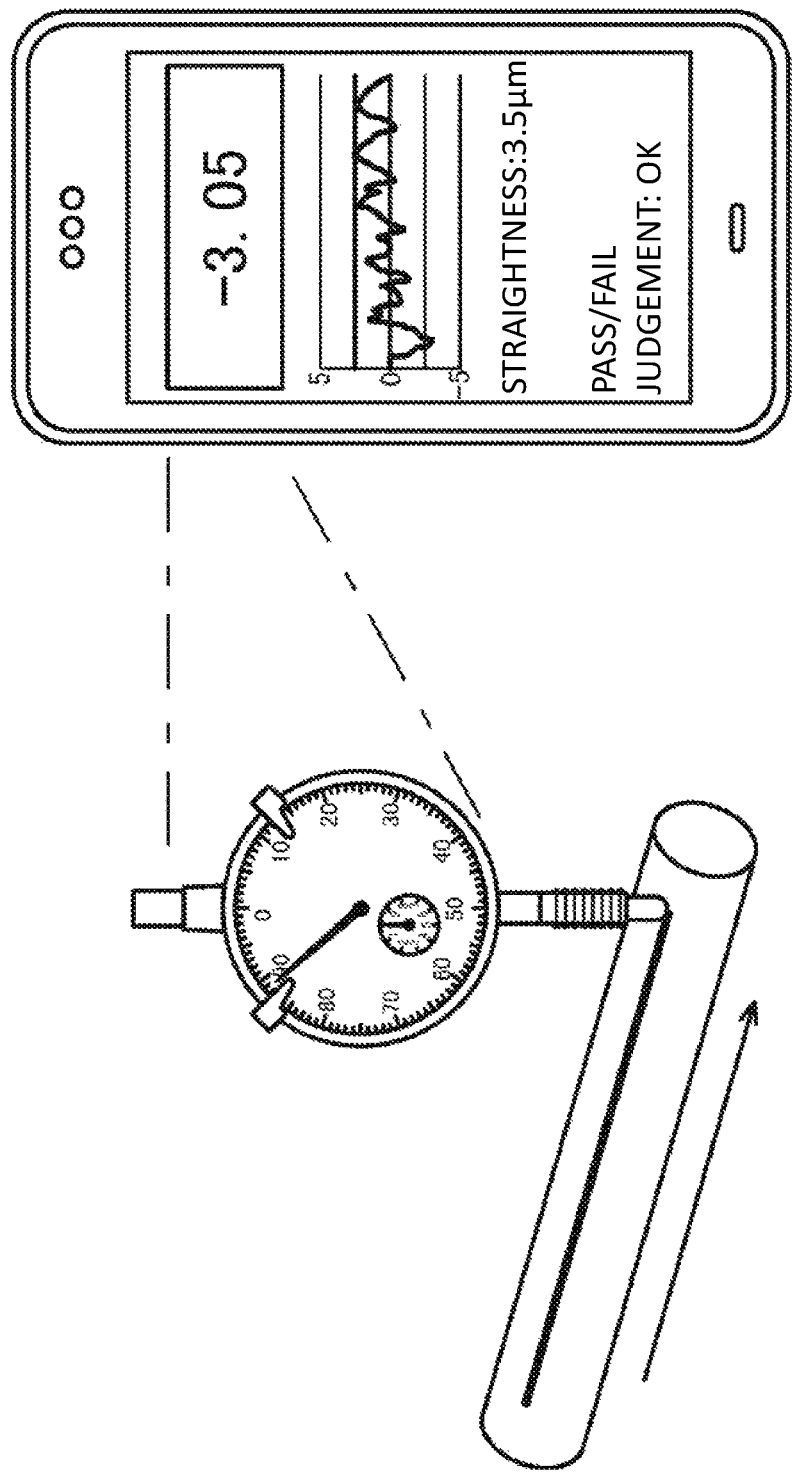
FIG. 14 is a diagram showing an example in which an apparatus for reading a value measured with an analog measuring tool is applied to a measurement of shape-geometric data.

FIG. 14 is a diagram showing an example in which the apparatus 100 for reading the measured value of the analog measuring tool according to the example 6 is applied to measuring of shape/geometrical data. As shown in FIG. 14, when a measurement probe of the analog dial gauge is moved on a surface of an object to be measured while being in contact with the surface of the object, the long hand and the short hand of the analog dial gauge continuously move according to irregularity of the surface of the object to be measured. At this time, a smartphone, that is, the apparatus 100 for reading the measured value of the analog measuring tool, takes a video of a scale plate of the analog dial gauge by using a camera, that is, the imaging unit 110. Then processes of steps G1 to G7 are performed at predetermined time intervals, and the measured value reading unit 160 continues to output the real-time measurement result.

In G8, the measured value output unit 170 generates a graph by plotting the measured values chronologically, and displays the graph on the display, that is, the display unit 120. The user can identify the measured values, straightness, flatness, etc. by viewing the graph. Pass/fail judgement with respect to a geometrical tolerance can be made.

As described above, according to the present embodiment, the shape/geometrical data can be measured with a very inexpensive device such as a smartphone. Conventionally, a very expensive measuring device has to be used to measure the shape/geometrical data, but measurement costs may be greatly reduced according to the present embodiment.

Example 6-2

Figure 15:
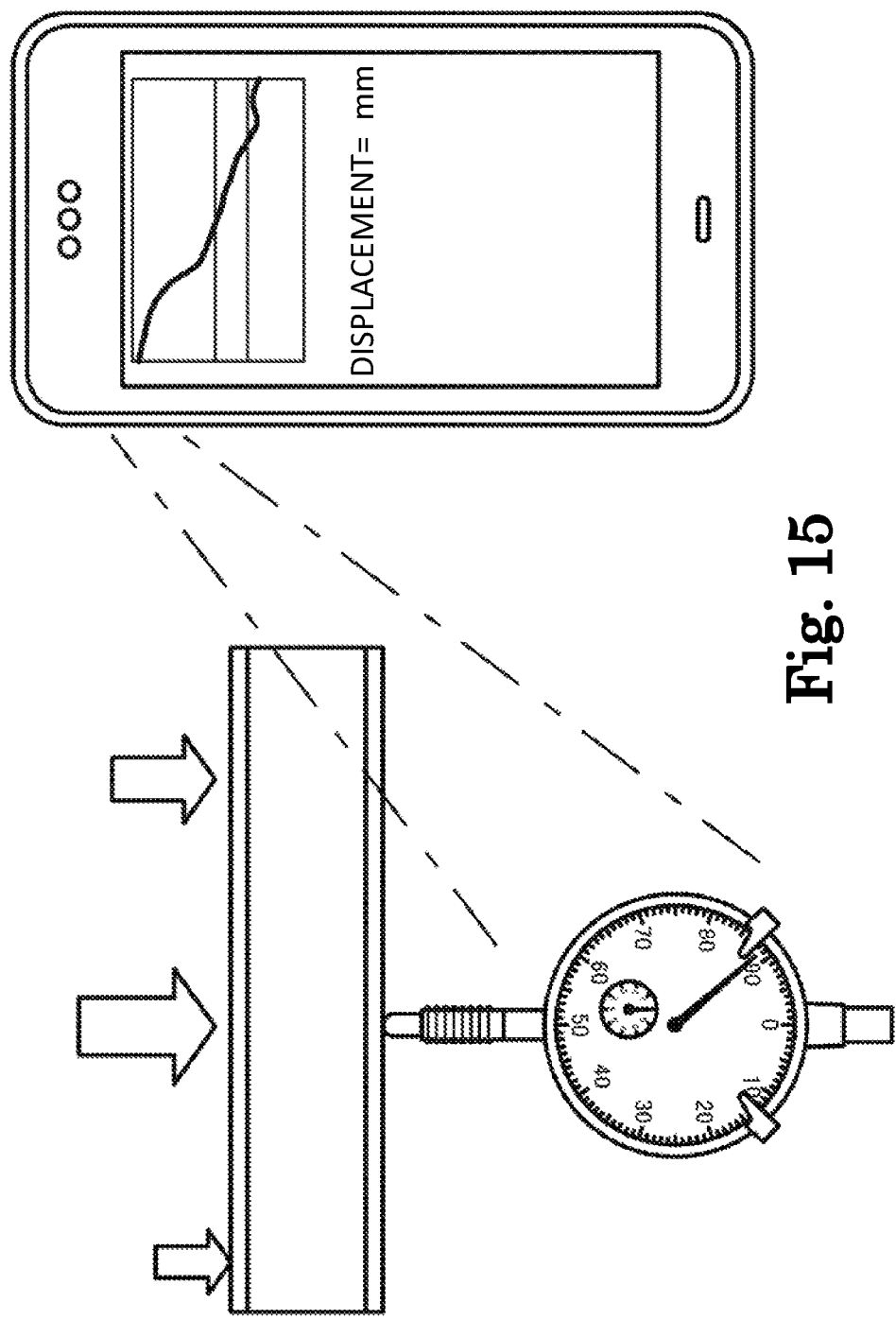
FIG. 15 is a diagram showing an example in which an apparatus for reading a value measured with an analog measuring tool is applied to a displacement gauge.

FIG. 15 is a diagram showing an example in which the apparatus 100 for reading a value measured with an analog measuring tool according to the example 6 is applied to a displacement gauge. As shown in FIG. 15, a measurement probe of the analog dial gauge is remained in contact with a surface of an object to be measured, such as a structure, etc. When deterioration, damage, etc. occurs in the structure, deformation or variation in position, that is, displacement, tends to become greater. When displacement of the object to be measured occurs, the long hand and the short hand of the analog dial gauge move according to the displacement. A smartphone, that is, the apparatus 100 for reading the measured value of the analog measuring tool, captures images of a scale plate of the analog dial gauge at every predetermined time interval by using a camera, that is, the imaging unit 110. Then processes of steps G1 to G7 are performed at every predetermined time interval, and the measured value reading unit 160 outputs the measurement result.

In step G8, the measured value output unit 170 generates a graph by plotting the measurement result chronologically, and transmits the graph to another information processing apparatus at a remote place via a communication function. Alternatively, the measured value output unit 170 may transmit the measured values as they are or after performing a predetermined process thereon to another information processing apparatus. In this case, another information processing apparatus may display the graph. Here, the measured value output unit 170 may transmit the data to outside at an arbitrary timing. For example, the data may be transmitted at every predetermined time interval (in real-time or with a predetermined time difference from the measurement). Alternatively, the data transmission may be performed with the measurement result exceeding a predetermined threshold as a trigger.

As described above, according to the present embodiment, the displacement of the structure can be observed and soundness can be checked by using a cheap device such as a smartphone. In addition, conventionally there is a need to set a temporary scaffold, etc. around the structure for every observation, but according to the present embodiment, once the analog dial gauge and the apparatus 100 for reading the measured value of the analog measuring tool are installed, the measurement result may be observed from a remote place. Besides the camera of the smartphone, a web camera, for example, may be used as the imaging unit 110. In this case, a captured image of the web camera may be received by the smartphone or a PC at a remote place, and the smartphone and the PC may calculate and output the measurement result.

Example 6-3

Figure 16:
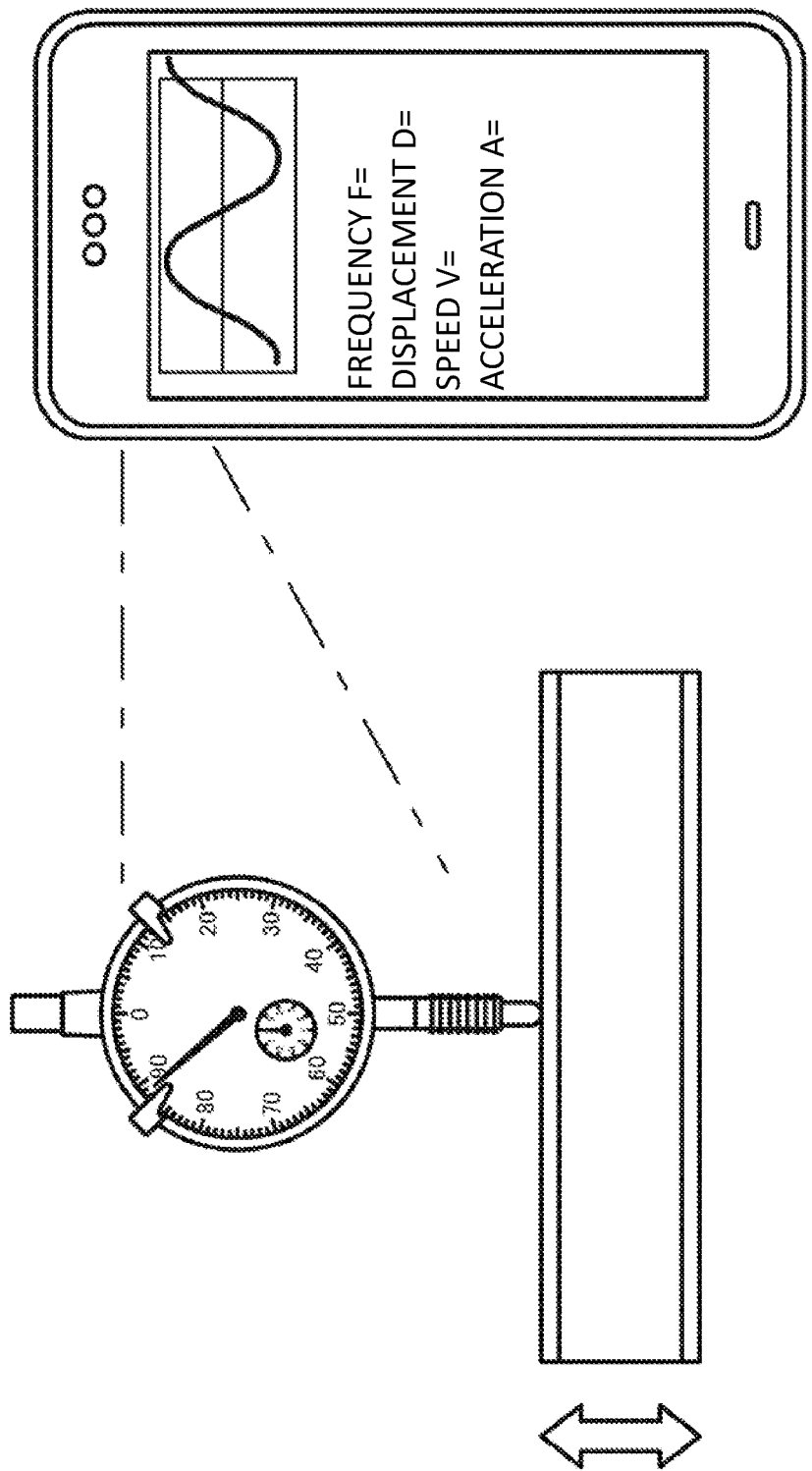
FIG. 16 is a diagram showing an example in which an apparatus for reading a value measured with an analog measuring tool is applied to a measurement of vibration.

FIG. 16 is a diagram showing an example in which the apparatus 100 for reading the measured value of the analog measuring tool according to the example 6 is applied to measuring of vibration. As shown in FIG. 16, a measurement probe of the analog dial gauge is remained in contact with a surface of an object to be measured, such as a bridge, etc. Then, the long hand and short hand of the analog dial gauge move according to occurrence of low-frequency vibration sound of the bridge. At this time, a smartphone, that is, the apparatus 100 for reading the measured value of the analog measuring tool, takes a video of a scale plate of the analog dial gauge by using a camera, that is, the imaging unit 110. Then processes of steps G1 to G7 are performed at predetermined time intervals, and the measured value reading unit 160 continues to output the real-time measurement result.

In G8, the measured value output unit 170 generates a graph by plotting the measurement result chronologically, and transmits the graph to another information processing apparatus at a remote place via a communication function. Alternatively, the measured value output unit 170 may transmit the measured results as they are or after performing a predetermined process thereon to another information processing apparatus. In this case, another information processing apparatus may display the graph. The measurement result may be used as base data for analyzing vibration. In the present embodiment, the measured value output unit 170 may transmit the data to outside at an arbitrary timing.

As described above, according to the present embodiment, vibration may be rapidly analyzed by using cheap equipment such as a smartphone, etc. without using an expensive high-precision vibration meter as in the related art. Once the analog dial gauge and the apparatus 100 for reading the measured value of the analog measuring tool are installed, a measurement result of even an object to be measured such as a bridge, which it is difficult to observe at any time, may be observed at any time from a remote place. In the present embodiment, the web camera, for example, may be used as the imaging unit 110.

According to the apparatus 100 for reading the measured value of the analog measuring tool of the present embodiment, the measured values of the analog micro-meter, the analog dial caliper, the analog dial gauge, etc. can be automatically read.

In the apparatus 100 for reading the measured value of the analog measuring tool according to the present embodiment, complementation of scales is performed in a case where the scales are not read due to dirt, or the like or the guidance is performed by the AR technique that causes the 3D model to overlap with the analog measuring tool when reading. Therefore, the reading robust against disorder of the tool posture or dirt can be performed to thereby further improve productivity.

The apparatus 100 for reading the measured value of the analog measuring tool according to the present embodiment can output the measured value read from the analog measuring tool. For example, time-serial data can be represented as a graph or can be provided as analyzing data to another information processing apparatus.

Modified Example of the First Embodiment

In the above first embodiment, the 3D matching unit 140 compares the captured image of the imaging unit 110 with a 3D model of the analog measuring tool retained by the 3D model retaining unit 130 and then specifies the analog measuring tool. However, a sensor (e.g., a depth sensor) that can sense an appearance configuration of the analog measuring tool may be provided in addition to the imaging unit 110, and then, the 3D matching unit 140 may compare data acquired by the sensor (e.g., point group data obtained by the depth sensor) with the 3D model of the analog measuring tool retained by the 3D model retaining unit 130 and may specify the analog measuring tool. That is, a sensor for obtaining a shape of the analog measuring tool and the imaging unit 110 for reading the measured value may be separately provided. The sensor that can sense the shape of the analog measuring tool may be any kind of sensor as well as the depth sensor exemplary shown above, provided that information for specifying the analog measuring tool can be obtained.

In the above first embodiment, the guidance unit 150 displays the guidance information on the display unit 120 regardless of whether to perform the correction in step S2, but the correction may be automatically performed in a case where the correction is possible and then the measurement result may be read. Here, when the posture is not suitable for the correction, the guidance information may be displayed on the display unit 120 to urge correction of the posture.

In the first embodiment, in step S4, the measured value reading unit 160 restores the scale lines and numbers that should have been represented originally with reference to the 3D model when some of the scales and numbers in the captured image may not be recognized due to dirt and the like. However, when the measured value reading unit 160 cannot recognize some scales and numbers in the captured image due to dirt and the like, the guidance unit 150 may notify existence of dirt so that the apparatus 100 may be properly used.

In the above first embodiment, the 3D matching unit 140 compares the captured image of the imaging unit 110 to the 3D model of the analog measuring tool retained by the 3D model retaining unit 130 to specify the analog measuring tool and a location or a region where scales of the specified analog measuring tool exist, but the 3D model retaining unit 130 may not retain the 3D models of the analog measuring tools. In addition, when there are common characteristics in shapes, positions, outer appearances, etc. of scales indicating the measured value according to the kind of tools, the 3D matching unit 140 performs an image recognition process with respect to the common features on the captured image of the imaging unit 110 to specify the location or region where the scales of the analog measuring tool are represented.

For example, since the dial gauge generally has a circular scale plate, a circular region in the captured image of the imaging unit 110 may be recognized and specified as a location or region where the scales are represented. When it is difficult to specify the kind of scale plate through the image recognition process, it may be preferable to provide an interface to urge the user to select an appropriate kind of scale plate.

Second Embodiment

Figure 17:
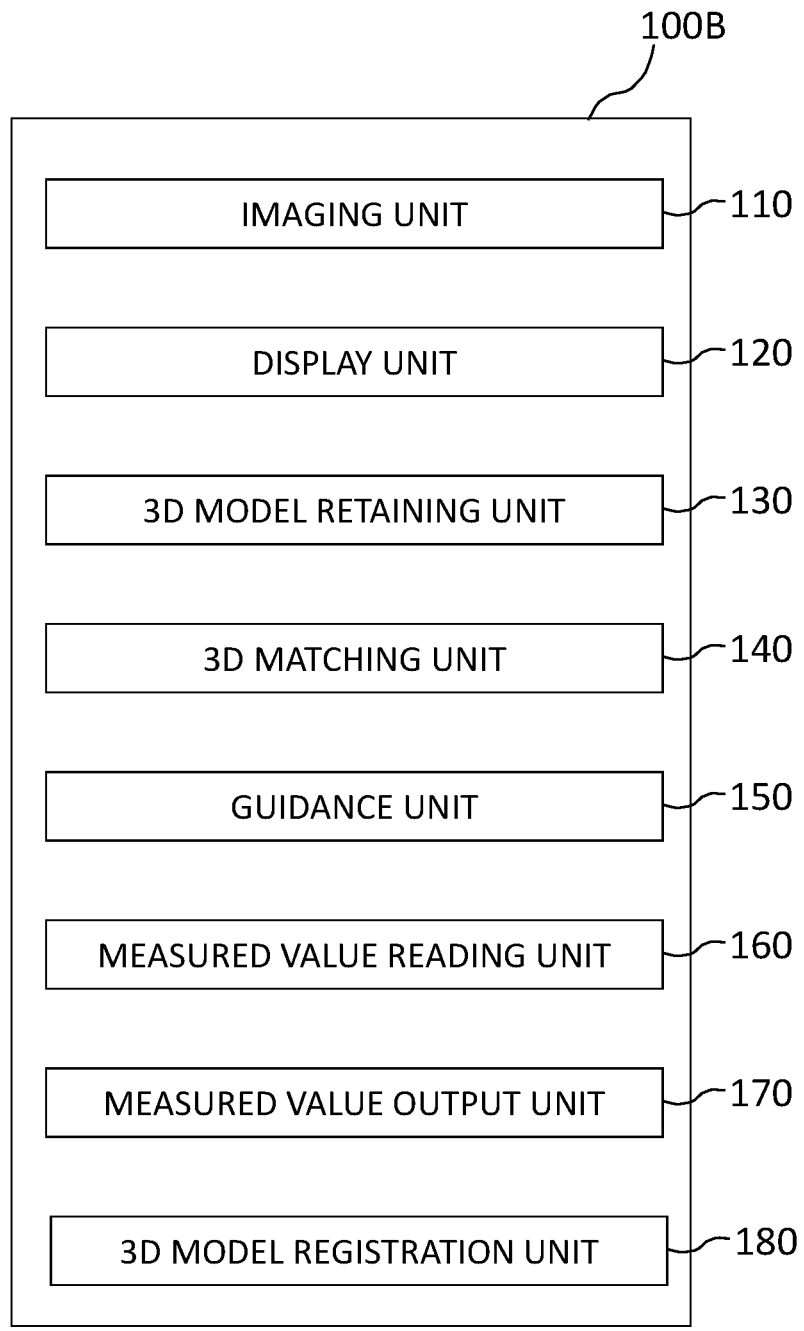
FIG. 17 is a block diagram illustrating a configuration of an apparatus for reading a value measured with an analog measuring tool, according to a second embodiment.

The second embodiment of the present disclosure will be described with reference to FIG. 17. An apparatus 100B for reading a value measured with an analog measuring tool according to the second embodiment further includes a three dimensional model registration unit (3D model registration unit) 180 capable of newly registering a 3D model of the analog measuring tool to the 3D model retaining unit 130 when the 3D model of the analog measuring tool, the measured value of which is to be read, is not retained in the 3D model retaining unit 130 in advance, as well as the components of the apparatus 100 for reading the measured value of the analog measuring tool according to the first embodiment (or modified example thereof). In addition, since other configurations than the configuration for implementing a function of registering a new 3D model by the 3D model registration unit 180 are the same as those of the above first embodiment, descriptions thereof are omitted.

When the 3D matching unit 140 fails to specify the analog measuring tool or a manipulation of instructing registration of a new 3D model is input from a user, the 3D model registration unit 180 extracts characteristic points in a shape of the analog measuring tool based on the captured image of the imaging unit 110 (or data obtained by the sensor that may sense the appearance configuration of the analog measuring tool described above with reference to the modified example of the first embodiment, hereinafter referred to collectively as shape data). The 3D model registration unit 180 displays on the display unit 120 the shape of the analog measuring tool to be registered, and at the same time, allows the user to select from the displayed outer appearance the reading range in which elements indicating the measured value such as the scales or needles are exhibited and a method of reading the measured value within the reading range via an input unit (not shown). The method of reading the measured value may be selected by the user from among a plurality of methods prepared in advance (e.g., various methods of reading the scales exemplified in the first embodiment). In addition, the 3D model registration unit 180 registers the characteristic point information of the outer appearance, the reading range, and the reading method on the 3D model retaining unit 130 after mapping.

When a new 3D model is registered on the 3D model retaining unit 130, the guidance unit 150 displays on the display unit 120 guidance information urging the user to perform a correction measurement. The user may perform the correction measurement in response to the guidance information. In the correction measurement, the measurement is performed in a direction in which the user determines that the measured value is most easily readable. The 3D model registration unit 180 registers the 3D model of the corresponding analog measuring tool on the 3D model retaining unit 130, while incorporating into the 3D model the direction of the analog measuring tool at the time of correction measurement as a confronting direction.

As described above, the apparatus 100B for reading the measured value of the analog measuring tool according to the second embodiment further includes the 3D model registration unit 180 capable of registering a 3D model of a new analog measuring tool in the 3D model retaining unit 130, and thus, the user can freely register an analog measuring tool that he/she owns.

The present disclosure is not limited to the above-described embodiments, but may be appropriately modified without departing from the spirit of the present disclosure. For example, the analog measuring tool shown in the above-described embodiments is an example, and the present disclosure may be also applied to other kinds of analog measuring tools. That is, any type of analog measuring tool may be used, provided that the measured value is indicated in an analog manner. The analog measuring tool may be, for example, a tool for measuring a size and a displacement amount such as an analog micro-meter, an analog micro-meter with a vernier, an analog caliper, an analog dial caliper, an analog dial gauge, etc. Alternatively, the analog measuring tool may be a tool for measuring a weight and a force such as an electronic balance, a torque wrench, etc.

In the above-described embodiments, the guidance unit 150 and the measured value output unit 170 output information on the display unit 120, but the present disclosure is not limited thereto; for example, the information may be output in another manner, for example, voice.

What is claimed is:

1. An apparatus for reading a value measured with an analog measuring tool, comprising:
one or more sensors configured to obtain shape data representing an appearance configuration of the analog measuring tool;
a memory configured to retain a three-dimensional model of the analog measuring tool, the three-dimensional model including information about a location or a region where a measured value of the analog measuring tool is indicated;
a camera configured to obtain a captured image of the analog measuring tool, the analog measuring tool indicating a measured value; and
a processor programmed to
specify the three-dimensional model that matches the shape data;
specify the location or the region where the measured value of the analog measuring tool is indicated, with reference to the specified three-dimensional model;
output guidance information for correcting an orientation of the analog measuring tool, based on the specified three-dimensional model;
correct the captured image based on the specified three-dimensional model, and to read the measured value indicated on the specified position or the specified region from the captured image to generate a measurement result; and
output the measurement result.

2. The apparatus according to claim 1, wherein the camera includes the one or more sensors, and the captured image obtained by the camera is used as the shape data.

3. The apparatus according to claim 1, wherein the processor is further programmed to register the shape data of the analog measuring tool obtained by the one or more sensors in the memory.

4. The apparatus according to claim 1, further comprising:
a display configured to display the captured image overlapping with the guidance information or the measurement result.

5. The apparatus according to claim 1, wherein the processor outputs a graph generated by plotting the measurement result being in chronological order.

6. The apparatus according to claim 1, wherein the analog measuring tool is an analog micro-meter, an analog micro-meter with a vernier, an analog caliper, an analog dial caliper, or an analog dial gauge.

7. The apparatus according to claim 1, wherein the processor generates an intermediate value of measured values of an analog dial gauge as the measurement result.

* * * * *